(12) United States Patent
Broughton et al.

(10) Patent No.: US 9,330,614 B2
(45) Date of Patent: May 3, 2016

(54) METHOD OF PROCESSING IMAGE DATA FOR DISPLAY ON A DISPLAY DEVICE, WHICH COMPRISING A MULTI-PRIMARY IMAGE DISPLAY PANEL

(71) Applicant: Sharp Kabushiki Kaisha, Osaka (JP)

(72) Inventors: Benjamin John Broughton, Oxford (GB); Charlotte Wendy Michele Borgers, Huntingdon (GB); Paul Antony Gass, Oxford (GB); Scott Boham, Cambridge (GB); Kenji Maeda, Osaka (JP); Tatsuo Watanabe, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 163 days.

(21) Appl. No.: 14/239,901

(22) PCT Filed: Oct. 25, 2012

(86) PCT No.: PCT/JP2012/006862
§ 371 (c)(1),
(2) Date: Feb. 20, 2014

(87) PCT Pub. No.: WO2013/061598
PCT Pub. Date: May 2, 2013

(65) Prior Publication Data
US 2014/0210878 A1 Jul. 31, 2014

(30) Foreign Application Priority Data

Oct. 28, 2011 (GB) .................................. 1118683.0

(51) Int. Cl.
*G09G 5/02* (2006.01)
*G09G 3/36* (2006.01)
(Continued)

(52) U.S. Cl.
CPC .............. *G09G 3/3607* (2013.01); *G06T 3/606* (2013.01); *G09G 3/003* (2013.01); *G09G 3/2059* (2013.01);
(Continued)

(58) Field of Classification Search
None
See application file for complete search history.

(56) References Cited

U.S. PATENT DOCUMENTS

| RE27,617 E | 4/1973 | Olsen |
|---|---|---|
| 4,764,410 A | 8/1988 | Grzywinski |

(Continued)

FOREIGN PATENT DOCUMENTS

| GB | 2 413 394 A | 10/2005 |
|---|---|---|
| GB | 2 428 152 A | 1/2007 |

(Continued)

OTHER PUBLICATIONS

International Search Report for corresponding International Application No. PCT/JP2012/006862 mailed Jan. 22, 2013.

(Continued)

*Primary Examiner* — Muhammad N Edun
(74) *Attorney, Agent, or Firm* — Renner, Otto, Boisselle & Sklar, LLP

(57) ABSTRACT

A method of processing image data for display on a display device having a multi-primary image display panel (2) comprises receiving image data constituting an image for display on the image display panel. In a first mode, signal voltages to be applied to sub-pixels of the image display panel are determined from the received image data and from a secondary data value for the pixel thereby to generate luminance variations perceivable at a first viewing position (5) but substantially not perceivable at a second viewing position (3). This provides a private display mode, since the luminance variations perceivable at the first viewing position (5) obscure the image from an observer at the first viewing position, while an observer at the second viewing position (3) is able to perceive the image since the luminance variations are not perceivable (or are substantially not perceivable) at the second viewing position In a second mode, signal voltages to be applied to sub-pixels of the image display panel may be determined just from the received image data thereby to generate an image perceivable at the first viewing position (5) and at the second viewing position (3). This provides a public or wide-view display mode.

29 Claims, 22 Drawing Sheets

(51) Int. Cl.
- *G06T 3/60* (2006.01)
- *G09G 3/20* (2006.01)
- *G09G 3/28* (2013.01)
- *G09G 3/00* (2006.01)

(52) U.S. Cl.
CPC ............... *G09G 3/28* (2013.01); *G09G 3/3648* (2013.01); *G09G 2320/068* (2013.01); *G09G 2320/0686* (2013.01); *G09G 2358/00* (2013.01)

(56) References Cited

U.S. PATENT DOCUMENTS

| | | | |
|---|---|---|---|
| 4,766,023 A | 8/1988 | Lu | |
| 2003/0146893 A1 | 8/2003 | Sawabe | |
| 2005/0264580 A1* | 12/2005 | Higgins | H04N 1/6075 345/589 |
| 2007/0040780 A1 | 2/2007 | Gass et al. | |
| 2007/0146608 A1 | 6/2007 | Jin et al. | |
| 2007/0296874 A1* | 12/2007 | Yoshimoto | G09G 3/003 348/739 |
| 2007/0296900 A1 | 12/2007 | Hong | |
| 2009/0058873 A1 | 3/2009 | Brown Elliott et al. | |
| 2009/0289968 A1* | 11/2009 | Yoshida | G09G 3/2025 345/691 |
| 2010/0214324 A1 | 8/2010 | Broughton et al. | |
| 2010/0277498 A1 | 11/2010 | Elliott et al. | |
| 2012/0299982 A1 | 11/2012 | Inada | |

FOREIGN PATENT DOCUMENTS

| | | | |
|---|---|---|---|
| GB | 2 439 961 A | 1/2008 | |
| GB | 2 455 061 A | 6/2009 | |
| KR | 2003-0065393 A | 8/2003 | |
| KR | 2008-0000497 A | 1/2008 | |
| KR | 2008-0011659 A | 2/2008 | |
| WO | WO 2006/132384 A1 | 12/2006 | |
| WO | WO 2009/110128 A1 | 9/2009 | |
| WO | WO 2011/034157 A1 | 3/2011 | |
| WO | WO 2011/034208 A1 | 3/2011 | |
| WO | WO 2011/034209 A1 | 3/2011 | |
| WO | WO 2011/102321 A1 | 8/2011 | |

OTHER PUBLICATIONS

Form PCT/ISA/237 for corresponding International Application No. PCT/JP2012/006862 dated Jan. 22, 2013.

Stokes et al "A standard default color space for the internet—sRGB" v.1.10, Nov. 5, 1996 available at http://www.w3.org/Graphics/Color/SRGB.html on Feb. 11, 2014.

"Specification fos sRGB", (Specified in IEC 61966-2-1:1999).

Ernst Lueder, Liquid Crystal Displays, Wiley and sons Ltd, 2001, p. 239.

K. Yoshiyama et al., "19.5L: Late-News Paper: A New Advantage of Multi-Primary-Color Displays", SID'10 Digest, pp. 281-282.

Thomas L. Credelle et al., "High-Pixel-Density PenTile Matrix RGBW Displays for Mobile Applications", IMID '05 Digest, pp. 867-872.

C.H. Brown et al, "72.1: Invited Paper: PenTile RGBW Colow Processing", SID'08, Digest, pp. 1112-1115.

K. Tomizawa et al., "Invited Paper: Extending the Applications of Multi-Primary Color LCDs", Proceedings of the IDW'09, 2009, pp. 1199-1202.

\* cited by examiner

Fig. 16

METHOD OF PROCESSING IMAGE DATA FOR DISPLAY ON A DISPLAY DEVICE, WHICH COMPRISES A MULTI-PRIMARY IMAGE DISPLAY PANEL

TECHNICAL FIELD

The present invention relates to a display device, such as an active matrix liquid crystal display device, which comprises colour sub-pixels of at least four different colours, and is switchable between a public and private display mode.

BACKGROUND ART

Multiprimary displays, consisting of at least four different colour sub-pixels, have been developed and produced in several different types, with several different performance aims.

Displays using more than the standard three (usually red, green and blue (RGB)) primaries for expansion of the range of displayable colours have been produced (Proceedings of the IDW'09, 2009, pp 1199-1202), as well as RGBW displays with an added white sub-pixel to improve display brightness and therefore efficiency (SID'08 Digest, pp 1112-1115). Multiprimary displays have also been produced with the aim of simultaneously increasing brightness, as well as increasing the ability to render fine image features on a sub-pixel level (IMID '05 Digest, pp 867-872). Displays with an additional yellow sub-pixel (RGBY) have also been developed possessing enhanced brightness, increased colour gamut, and increased sub-pixel rendering ability (SID'10 Digest, pp 281-282). As multiprimary displays have more than three types of colour sub-pixel, for many colour and luminance values, there may be multiple configurations of individual data values supplied to the colour sub-pixels which produce the target colour. The multiple configurations producing the same overall luminance and chromaticity are known as metamers. Selection of which of a set of possible metamers to use for a particular pixel in an image, based on sub-pixel rendering considerations, is described in US2010 0277498.

Several types of display which switchable between a public and private display mode, with varying degrees of additional cost over a standard display, ease of use and strength of privacy performance are also well known.

Devices incorporating such displays include mobile phones, Personal Digital Assistants (PDAs), laptop computers, desktop monitors, Automatic Teller Machines (ATMs) and Electronic Point of Sale (EPOS) equipment. Such devices can also be beneficial in situations where it is distracting and therefore unsafe for certain viewers (for example drivers or those operating heavy machinery) to be able to see certain images at certain times, for example an in car television screen while the car is in motion.

Several methods exist for adding a light controlling apparatus to a naturally wide-viewing range display, such as a microlouvre film (USRE27617 (F. O. Olsen; 3M 1973), U.S. Pat. No. 4,766,023 (S.-L. Lu, 3M 1988), and U.S. Pat. No. 4,764,410 (R. F. Grzywinski; 3M 1988)). However, this and other methods involving detachable optical arrangements are not conveniently switchable, requiring as they do manual placement and removal of the film or other apparatus to change the display from the public to the private mode.

Methods of providing an electronically switchable privacy function are disclosed in GB2413394 (Sharp), WO06132384A1 (Sharp, 2005) and GB2439961 (Sharp). In these inventions, a switchable privacy device is constructed by adding one or more extra liquid crystal layers and polarisers to a display panel. The intrinsic viewing angle dependence of these extra elements can be changed by switching the liquid crystal electrically in the well-known way. Devices utilising this technology include the Sharp Sh851i and Sh902i mobile phones. These methods share the disadvantages that the additional optical components add thickness and cost to the display.

Methods to control the viewing angle properties of an LCD by switching the single liquid crystal layer of the display between two different configurations, both of which are capable of displaying a high quality image to the on-axis viewer are described in US20070040780A1 and GB 0721255.8. These devices provide the switchable privacy function without the need for added display thickness, but require complex pixel electrode designs and other manufacturing modifications to a standard display.

One example of a display device with privacy mode capability with no added display hardware complexity is the Sharp Sh702iS mobile phone. This uses a manipulation of the image data displayed on the phone's LCD, in conjunction with the angular dataluminance properties inherent to the liquid crystal mode used in the display, to produce a private mode in which the displayed information is unintelligible to viewers observing the display from an off-centre position. A key advantage of this type of method is that in the public mode, the display consists of, and operates as, a standard display, with no image quality degradation causes by the private mode capability. However, when in the private mode, the quality of the image displayed to the legitimate, on-axis viewer is severely degraded.

Improved schemes which, when in the private mode, manipulate the image data in a manner dependent on a second, masking, image, and therefore causes that masking image to be perceived by the off-axis viewer when the modified image is displayed, are given in GB2428152A1, WO2009110128A1, WO201134209 and WO201134208. These methods provide an electronically switchable public/private display with no additional optical elements required, minimal additional cost, and satisfactory privacy performance. However, as the methods all utilise the limited resolution of the human visual system by representing the main and side images using the average luminance produced by groups of adjacent pixels. Therefore, a resolution loss in the image display to the On-axis viewer is incurred.

It is therefore desirable to provide a high quality LCD display which has public and private mode capability, in which no modification to the LC layer or pixel electrode geometry is required from a standard display, has a substantially unaltered display performance (brightness, contrast resolution etc) in the public mode, and in the private mode has a strong privacy effect with minimal degradation to the on-axis image quality, particularly with regard to resolution loss incurred in the private mode.

CITATION LIST

Patent Literature

PTL 1: USRE27617
PTL 2: U.S. Pat. No. 4,766,023
PTL 3: U.S. Pat. No. 4,764,410
PTL 4: GB2413394
PTL 5: WO06132384A1
PTL 6: GB2439961
PTL 7: US20070040780A1
PTL 8: GB 0721255.8
PTL 9: GB2428152A1
PTL 10: WO2009110128A1

PTL 11: WO201134209
PTL 12: WO201134208

SUMMARY OF INVENTION

A first aspect of the invention provides a method of processing image data for display on a display device, the display device comprising a multi-primary image display panel, the method comprising: receiving image data constituting an image for display on the image display panel; and in a first mode, determining signal voltages to be applied to sub-pixels of the image display panel from the received pixel data and from a secondary data value for the pixel thereby to generate luminance variations perceivable at a first viewing position but substantially not perceivable at a second viewing position.

This mode of operation of the display device provides a private (narrow-view) display mode for the multi-primary image display panel (which is a display panel having pixels or sub-pixels of more than the standard three primary colours such as, for example, an RGBW or RGBY image panel). The luminance variations generated as a result of the secondary data values serve to obscure the image that would be generated if the received image data were the sole input, so that a viewer at the first viewing position (for example position 5 in FIG. 2) which is outside the intended viewing range in the private mode (the narrow viewing range 6 in FIG. 2) cannot make out the image, or can only see a degraded version of the image, owing to the superposed luminance variations. A viewer at the second viewing position (for example position 3 in FIG. 2) which is inside the intended viewing range in the private mode perceives little or no luminance variations, and so sees the original image (that is, the image that would be generated if the received image data were the sole input) with little or no degradation in image quality.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIG. 16: is a diagram illustrating the pattern of pixel data modifications of an embodiment of the present invention applied to a Pentile type display with high spatial frequency input data.

DESCRIPTION OF EMBODIMENTS

In a first embodiment, the display consists of a standard (single wide-viewing (public) mode only), multiprimary (comprising four or more types of colour sub-pixel) LCD display, with modified control electronics. An LCD display generally consists of several component parts including:

1. A backlighting unit to supply even, wide angle illumination to the panel.

Figure 1:
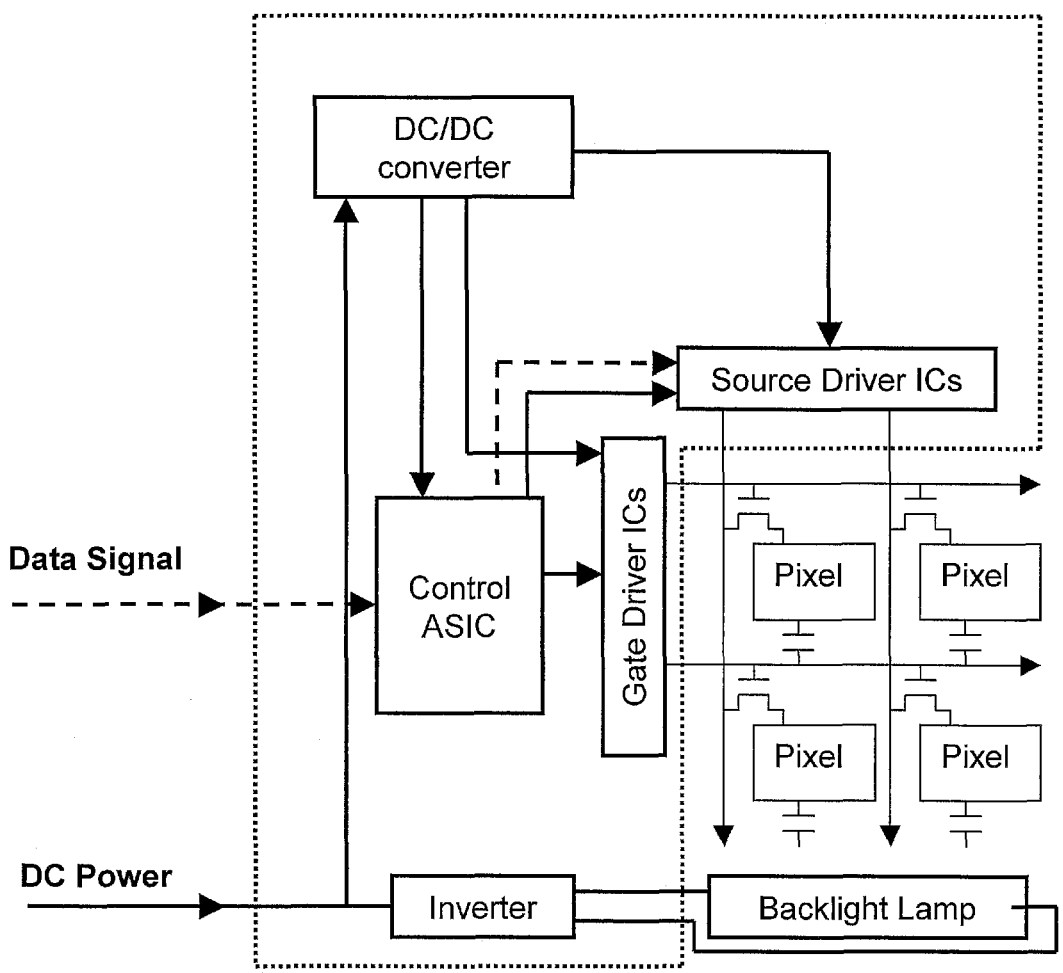
FIG. 1: is an example schematic of a standard LCD display panel and associated control electronics.

2. Control electronics to receive digital image data and output analogue signal voltages for each pixel, as well as timing pulses and a common voltage for the counter electrode of all pixels. A schematic of the standard layout of an LCD control electronics is shown in FIG. 1 (Ernst Lueder, Liquid Crystal Displays, Wiley and sons Ltd, 2001).

3. A liquid crystal (LC) panel, for displaying an image by spatial light modulation, consisting of two opposing glass substrates, onto one of which is disposed an array of pixel electrodes and active matrix array to direct the electronic signals, received from the control electronics, to the pixel electrodes. Onto the other substrate is usually disposed a uniform common electrode and colour filter array film. Between the glass substrates is contained a liquid crystal layer of given thickness, usually 2-6 micro meter, which may be aligned by the presence of an alignment layer on the inner surfaces of the glass substrates. The glass substrates will generally be placed between crossed polarising films and other optical compensation films to cause the electrically induced alignment changes within each pixel region of the LC layer to produce the desired optical modulation of light from the backlight unit and ambient surroundings, and thereby generate the image.

Figure 2:
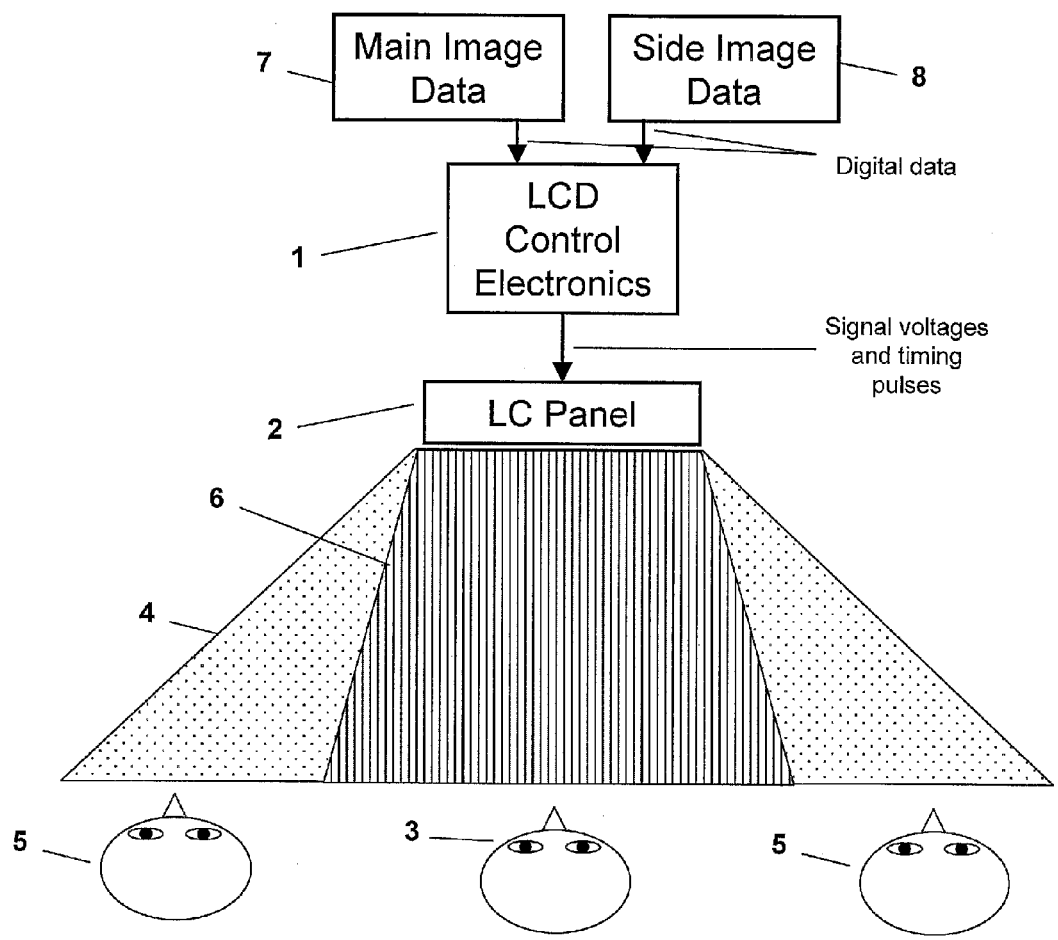
FIG. 2: is a schematic of a display with a switchable public/private viewing mode, according to an embodiment of the present invention.
Figure 3:
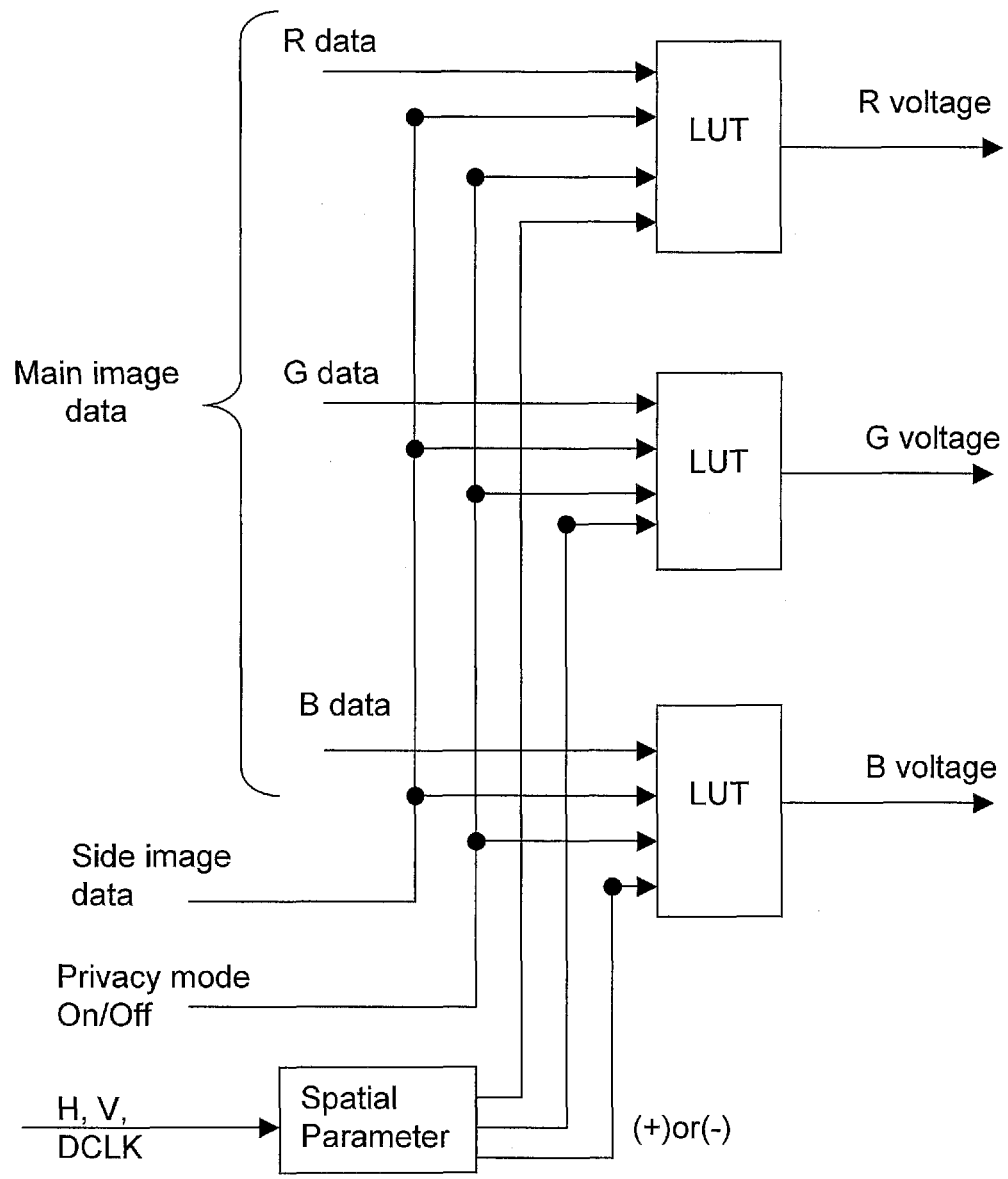
FIG. 3: is a schematic illustrating how a portion of the control electronics of the prior art for an RGB type display may be implemented in an electronic circuit.

An embodiment of the present invention is represented schematically in FIG. 2. Generally the LCD Control Electronics (referred to herein also as control electronics), 1, will be configured specifically to the electro-optical characteristics of the LC panel, 2, so as to output signal voltages which are dependent on the input image data in such a way as to optimise the perceived quality of the displayed image, i.e. resolution, contrast, brightness, response time etc, for the principal viewer, 3, observing from a direction normal to the display surface (on-axis). The relationship between the input image data value for a given pixel and the observed luminance resulting from the display (gamma curve) is determined by the combined effect of the data-value to signal voltage mapping of the display driver, and the signal voltage to luminance response of the LC panel.

The multi-primary LC panel, 2, will generally be configured with multiple LC domains per sub-pixel and/or passive optical compensation films so as to preserve the display gamma curve as closely as possible to the on-axis response for all viewing angles, thereby providing substantially the same high quality image to a wide viewing region, 4. However, it is an inherent property of liquid crystal displays that their electro-optic response is angularly dependent and the off-axis gamma curve will inevitably differ from the on-axis one. As long as this does not result in contrast inversion or large colour-shift or contrast reduction, this does not generally result in an obvious perceived fault in the observed image for the off-axis viewer, 5.

When the device of this embodiment is operating in the public mode, a set of main image data, 6, constituting a single image, is input to the control electronics, 1, in each frame period. The control electronics then outputs a set of signal data voltages to the LC panel, 2. Each of these signal voltages is directed by the active matrix array of the LC panel to the corresponding pixel electrode and the resulting collective electro-optical response of the pixels in the LC layer generates the image.

The control electronics has a single mapping of input pixel data value to output pixel data voltage (Look-up table 2, which it applies to the process for all pixels. In some cases a different look-up table may be used for the red, green and blue sub-pixels of the display, but there is no variation in the mapping of input data to output voltage based on the spatial position of the pixel data within the image, or the pixel electrode within the display. Substantially the same image is then perceived by the on-axis viewer, 3, and off-axis viewers, 5, and the display can be said to be operating in a wide viewing mode.

When the device is operating in the private mode, two image datasets are input to the control electronics, 1, in every frame period: main image data, 7, constituting a main image, and side image data, 8, constituting a side image.

The control electronics then outputs a set of signal data voltages, one data voltage for each pixel in the LC panel as previously. However, the control electronics (display controller) now utilises an expanded look-up table (LUT) and the output signal data voltage for each pixel in the LC panel, constituting a combined image, is dependent on the data values for the corresponding pixel (in terms of spatial position in the image) in both the main, 7, and side, 8, images. The output data voltage for each pixel may also be dependent on a third parameter determined by the spatial position of the pixel within the display.

In this way, the standard LCD control electronics are modified to receive, and store in a buffer, two, rather than one, images per frame period, and also to map the data values of two input images to a single output voltage per pixel, possibly also taking into account a third, spatially dependent, parameter into this mapping. In this case the mapping of input image data to output pixel voltage is no longer identical for all pixels, or even all sub-pixels of the same colour component, in the display.

The third, spatially dependent, parameter may be a "flag" value indicating which of two or more groups the pixel is deemed to be in based on its spatial position. For example, pixels in odd numbered columns in the image array may be said to form one group and pixels in even columns another. The groups could also constitute odd and even pixel rows, or perhaps the two parts of a chequerboard arrangement of the pixel array, etc.

The output voltage from the control electronics, 1, then causes the multi-primary LC panel, 2, to display a combined image which is the main image when observed by the main viewer, 3, with minimal degradation of the main image quality. However, due to the different gamma curve characteristic of the LC panel for the off-axis viewers, 5, these off-axis observers perceive the side image most prominently, which obscures and/or degrades the main image, securing the main image information to viewers within a restricted cone of angles centred on the display normal, 6. The modifications to the control electronics achieve this by altering the brightness of groups of two or more neighbouring sub-pixels of the same colour type from that specified by the main image data, so that while the group maintains a luminance the same or proportional to the overall or average luminance as specified by the main image data as observed by the on-axis viewer, 3, the distribution of luminance within the group is changed to a greater or lesser extent. For example, two sub-pixels of 50% luminance may have their luminance altered in equal and opposite directions, so they maintain the same average to the on-axis viewer, but their average luminance to the off-axis viewer, 5, changes as the degree of alteration is increased.

The invention so far described amounts thus makes it possible to apply the methods for producing a switchable privacy mode disclosed in GB2428152A1, WO2009110128A1, WO201134209 and WO201134208, applied to a multi-primary LCD panel, and the above noted applications are incorporated herein by reference. The remainder of this disclosure will concentrate on the optimal preferred means of applying the methods of the above applications to multi-primary displays in order to maximise main image quality in the private mode, as well as variations and developments on these methods designed to improve the performance of such privacy technology on multiprimary displays.

In a further embodiment, the display consists of a multiprimary display incorporating the modified control electronics described above, and in the aforementioned references, for providing a switchable privacy mode. In order to incorporate such a privacy mode, the modified control electronics would have to be expanded from those of the prior art to provide for processing of the extra colour sub-pixel data, over the standard RGB data. Such an expanded modified control electronic may take the form of those illustrated in FIG. 4 for an RGBW display.

Note in this figure, the main image data, 7, input to the modified control electronics, 1, already consists of separate R, G, B and W channels. In most multiprimary displays, the display control electronics accept RGB data only, and the data for additional sub-pixels is generated using a gamut mapping algorithm or some other calculation. For the purposes of this disclosure, it will be assumed that this is the case (ie, that the display control electronics accept RGB data only), and the image data processing applied to produce the privacy effect is applied to each of the final number of colour channels separately. It may be the case though that the display is configured to accept data in an increased number of colour channels, or that the privacy processing is performed on the RGB data channels, and then the additional colour channel data generation process is modified to carry the privacy data processing through to the additional channels.

For simplicity, the embodiments described herein will be as pertaining to RGBW or RGBY multiprimary displays. It should be noted however, that the same embodiments, with minor modifications obvious to the reader skilled in the art, will be applicable to other four primary displays, such as an RGBG type layout, or displays with 5, 6 or more types of primary colour sub-pixel, such as large gamut RGBCMY displays.

As noted above, GB2428152A1, WO2009110128A1, WO201134209 and WO201134208 provide an electronically switchable public/private display by making use of the limited resolution of the human visual system by representing the main and side images using the average luminance produced by groups of adjacent pixels. Therefore, a resolution loss in the image display to the On-axis viewer is incurred. To prevent this, in the present embodiment, for an RGBW display, the spatial "flag" parameter may be configured so that for adjacent pixels, one pixel will have the brightness of the R, G and B sub-pixels increased, and the brightness of the W pixel decreased, while the other pixel will have the sub-pixel brightnesses modified in the opposite direction. In this way if the input luminances of the R, G, B and W pixels are equal, i.e. a greyscale image, and the W pixel provides luminance equal to the sum of the R, G and B pixel luminances at the same data values, then the change in luminance and chromaticity applied to the R, G and B sub pixels in total is equal and opposite to that applied to the W pixel, so no loss of resolution occurs. This effect is illustrated in FIGS. 5 and 6.

Figure 5:
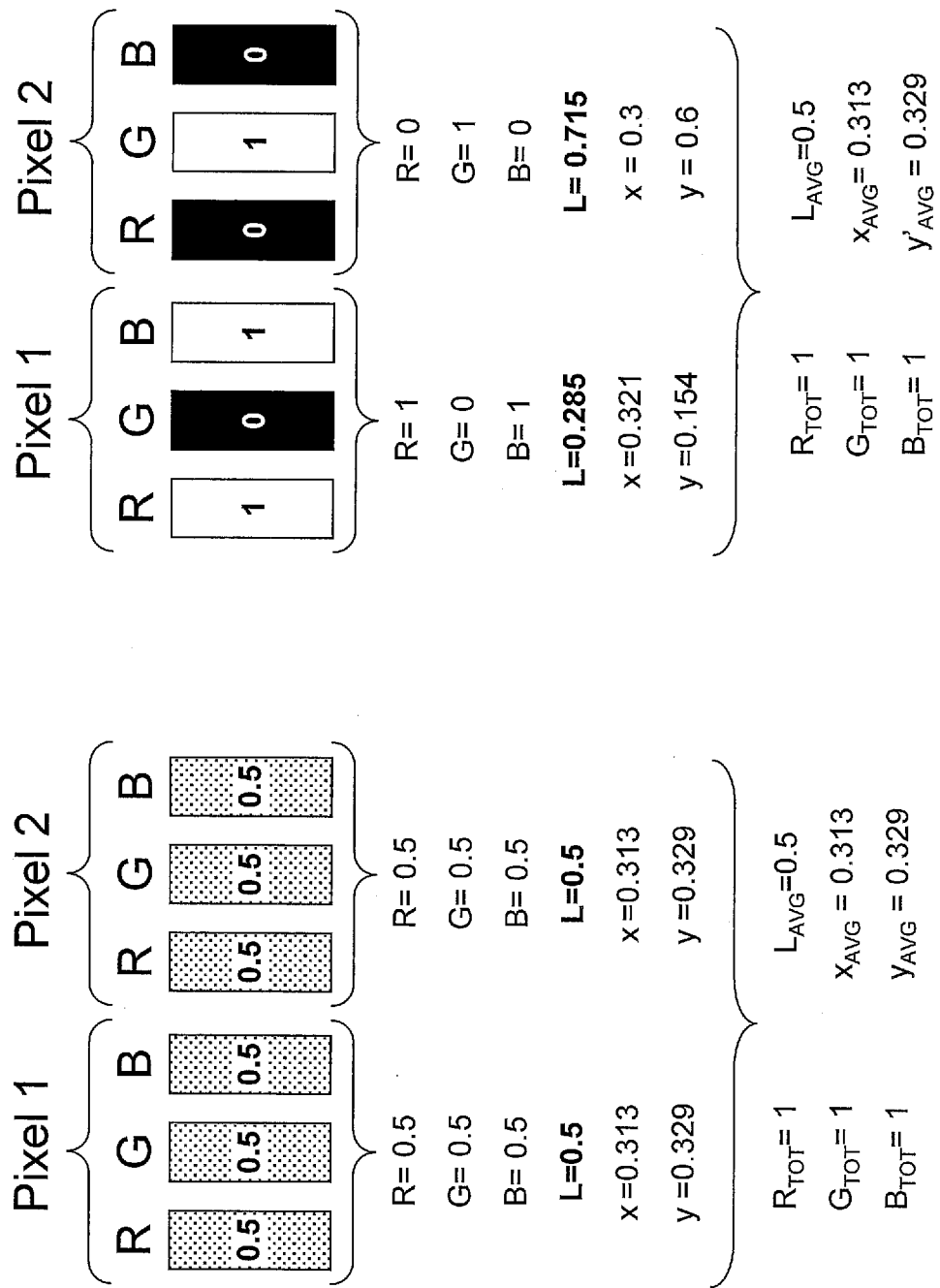
FIG. 5: is a diagram illustrating the pattern of pixel data modifications applied in a method of the prior art, and the resulting image resolution loss.

FIG. 5 shows that for an RGB display, a pair of pixels in which all the sub-pixels are at 50% luminance (mid grey), may be modified so that all pixels are at either zero or maximum luminance, while maintaining the same amounts of average luminance from each sub-pixel type, and therefore the same overall luminance and chromaticity. This is the approach used in GB2428152A1, WO2009110128A1, WO201134209 and WO201134208. This involves changing the luminance and chromaticity produced by each RGB pixel individually however. As the correct luminance and chromaticity is only produced by the two pixels together, this may be considered as a loss of resolution. The pattern of modification which minimises the change in overall luminance of the individual pixels of the pair is one in which the green sub-pixel of pixel 1 is made darker, while the red and blue sub-pixels are made brighter, with the opposite changes occurring in pixel 2. Even with this minimal change configuration, the overall luminance of the pixels is changed from 0.5 to 0.285 or 0.715, a 21.5% error. (In FIGS. 5 to 8, the overall luminance (L) and chromaticity (x, y) values are calculated assuming the display conforms to the sRGB colour standard. The details of the XYZ tristimulus values of the primary colours, and equations for calculating the overall luminance and chromaticity of an sRGB pixel with given RGB values are given in IEC 61966-2-1:1999 and in Stokes et al "A standard default color space for the internet-sRGB" v.1.10 1996.)

Figure 6:
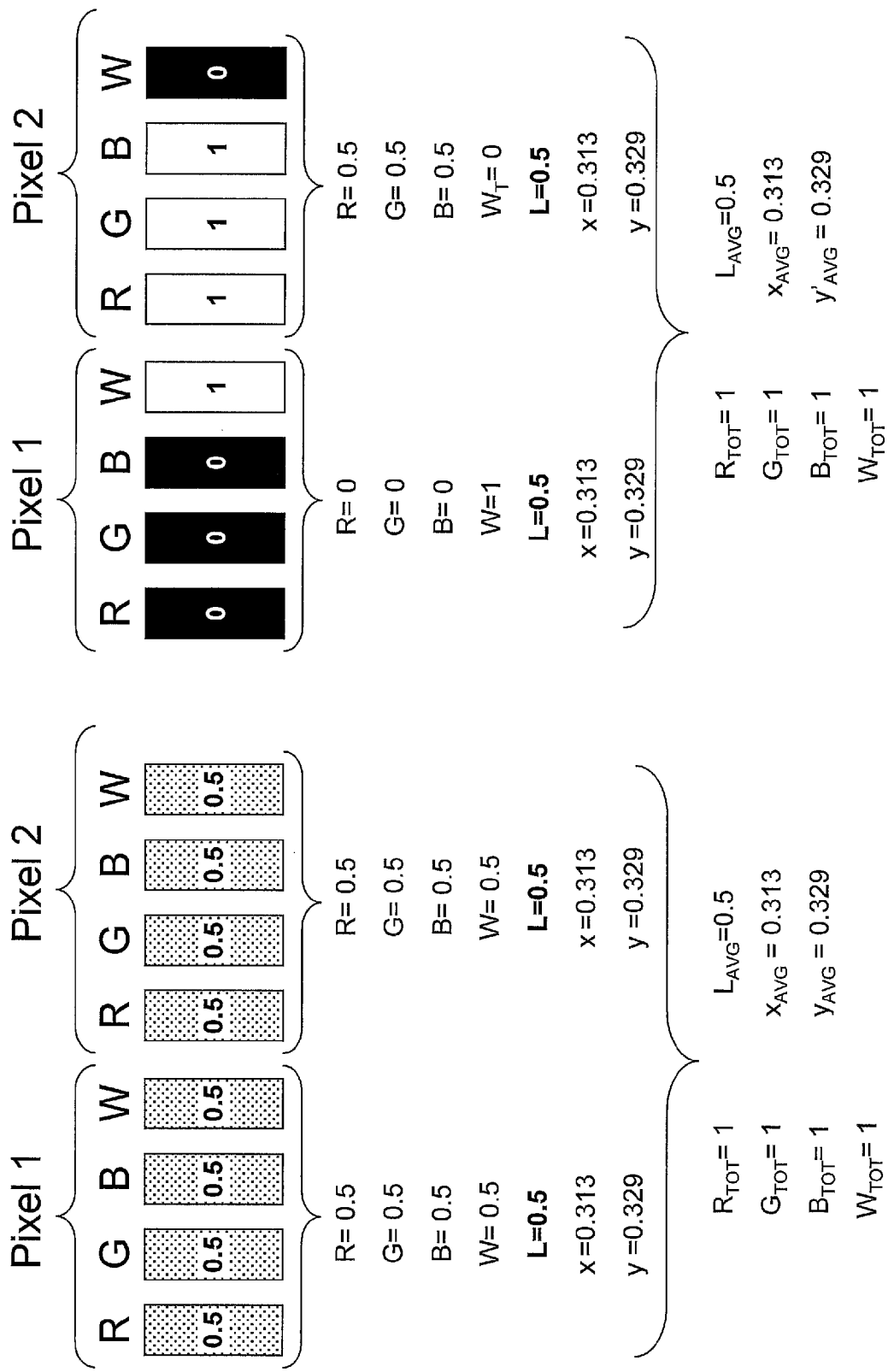
FIG. 6: is a diagram illustrating the pattern of pixel data modifications of an embodiment of the present invention, showing no resolution loss resulting from the modifications.

FIG. 6 shows that if the same modifications are applied to a pair of pixels in an RGBW type display, using the spatial configuration of modifications described above, then there is no change of luminance or chromaticity within each pixel, so no resolution loss has occurred. The process uses the fact that the three configurations of sub-pixel values are metamers, producing the same overall result despite having different sub-pixel values.

Even if the R, G, B and W values are not equal, the overall change in luminance incurred within a single pixel will be greatly reduced for most colours than the equivalent processing applied to an RGB only display, when altering the distribution of the same overall luminance between two or more sub-pixels of the same type. This reduced change in overall pixel luminance caused, for coloured main image input data, is shown in FIGS. 7 and 8.

Figure 7:
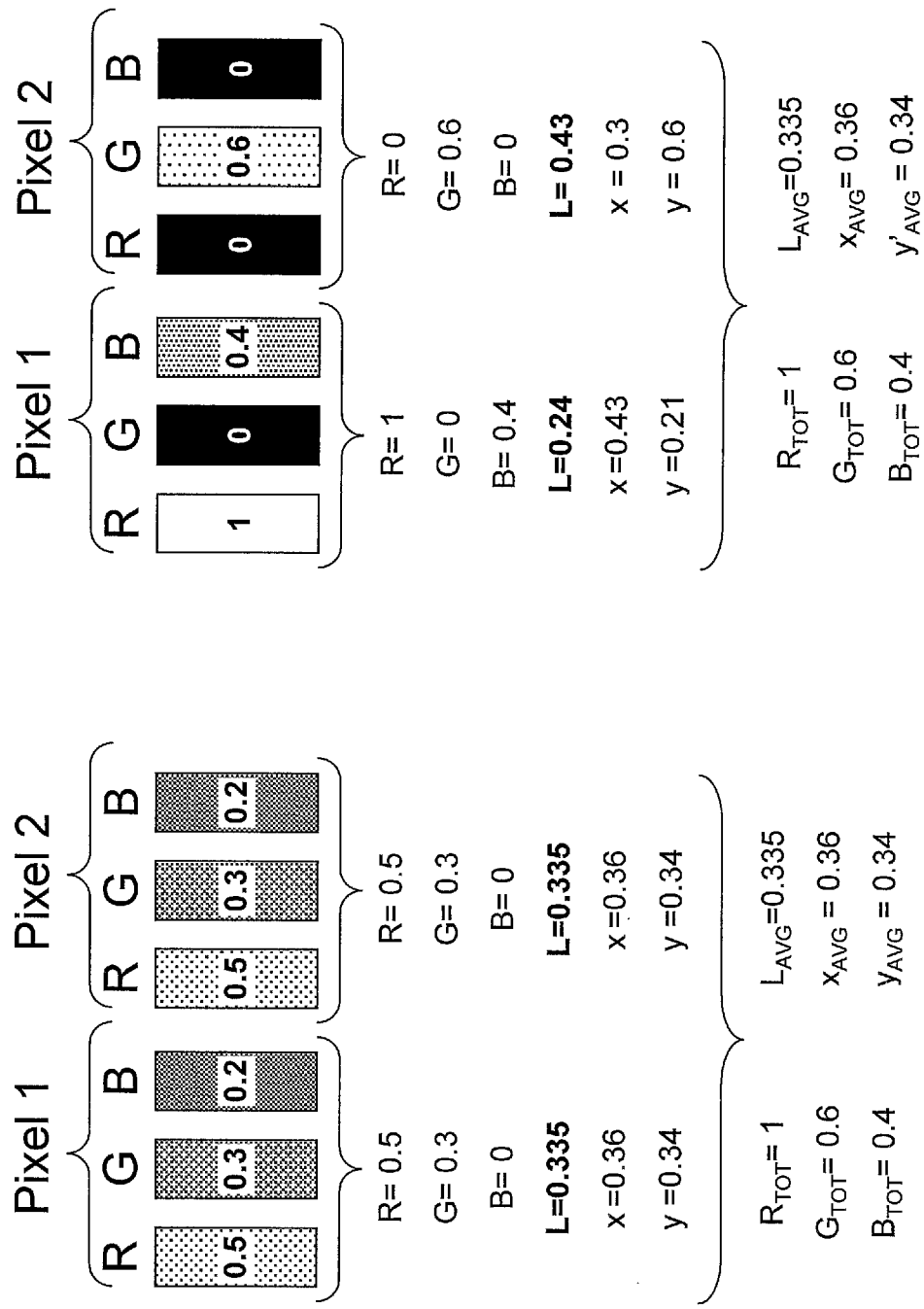
FIG. 7: is a diagram illustrating the pattern of pixel data modifications applied to a coloured input data in a method of the prior art, and the resulting image resolution loss.

FIG. 7 shows a pair of pixels each producing an overall light skin tone colour. If the overall luminance of each pair of like colour sub-pixels is redistributed so that, rather than being equal in each pixel, is maximally concentrated in one of the two pixels, again the overall luminance and chromaticity of the pair is maintained, but the luminance and chromaticity of the individual pixels is altered, even when patterning the direction of modification of each pair of sub-pixels to minimise this. Each pixel has its luminance changed from 0.335 to 0.24 or 0.43.

Figure 8:
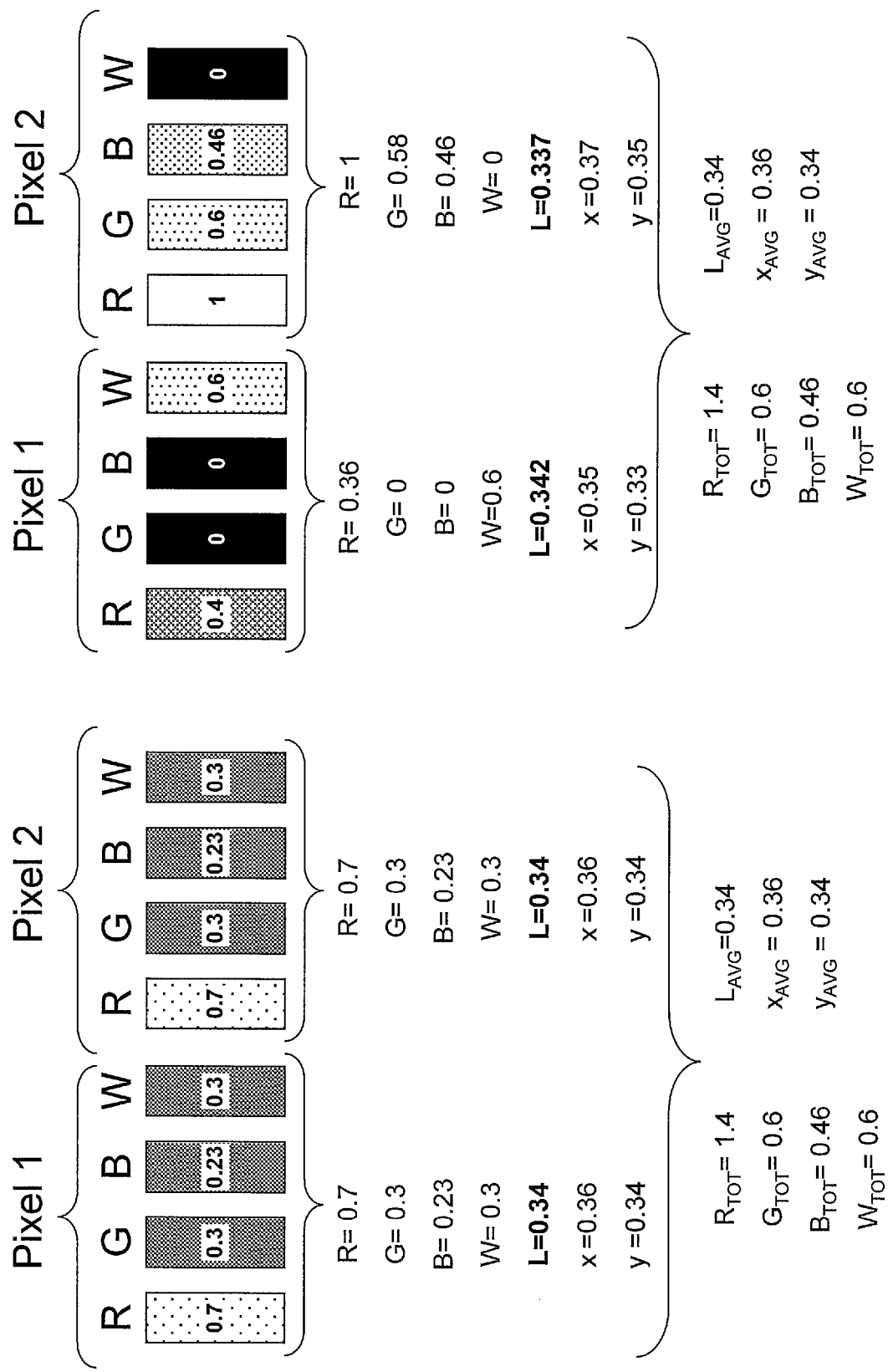
FIG. 8: is a diagram illustrating the pattern of pixel data modifications of an embodiment of the present invention applied to a coloured input data, showing reduced resolution loss resulting from the modifications.

FIG. 8 shows the same process applied to an RGBW display, starting with RGBW values which give very similar luminance and chromaticity values as in FIG. 7. In this instance, if the overall luminance of each sub-pixel pair is maximally concentrated in one of the pair, the overall luminance an chromaticity of each RGBW pixel cannot be maintained, but the luminance error is only 0.342-0.34 (0.2%) compared to the 9.5% error of the RGB display.

In a further embodiment, for an RGBY display the spatial "flag" parameter may be configured so that for adjacent groups of sub-pixels, one group will have the brightness of the R and G sub-pixels increased, and the brightness of the B and Y sub-pixels decreased, while the other group will have the sub-pixel brightnesses modified in the opposite direction.

Figure 9:
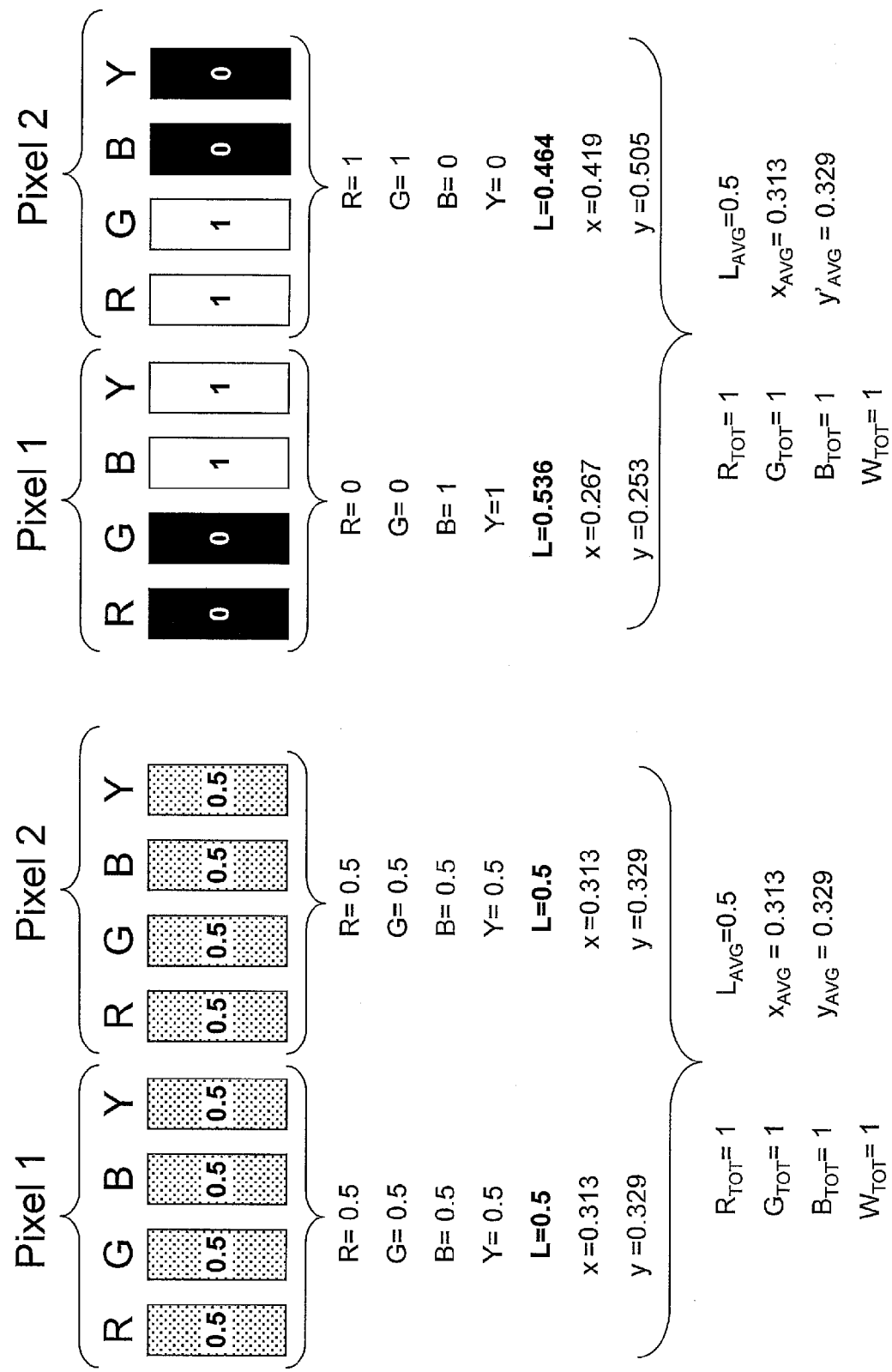
FIG. 9: is a diagram illustrating the pattern of pixel data modifications of an embodiment of the present invention applicable to RGBY type multiprimary displays, showing reduced resolution loss resulting from the modifications.

Although this does not result in privacy processing for greyscale images with no resolution loss, as is possible for an RGBW display, it does result in significantly reduced resolution loss in comparison to an RGB display As shown in FIG. 9, the individual pixel luminances are changed from 0.5 to 0.536 or 0.464 by the modifications, a luminance error of only 3.6%, compared to the 21.5% error of the RGB display.

Figure 10:
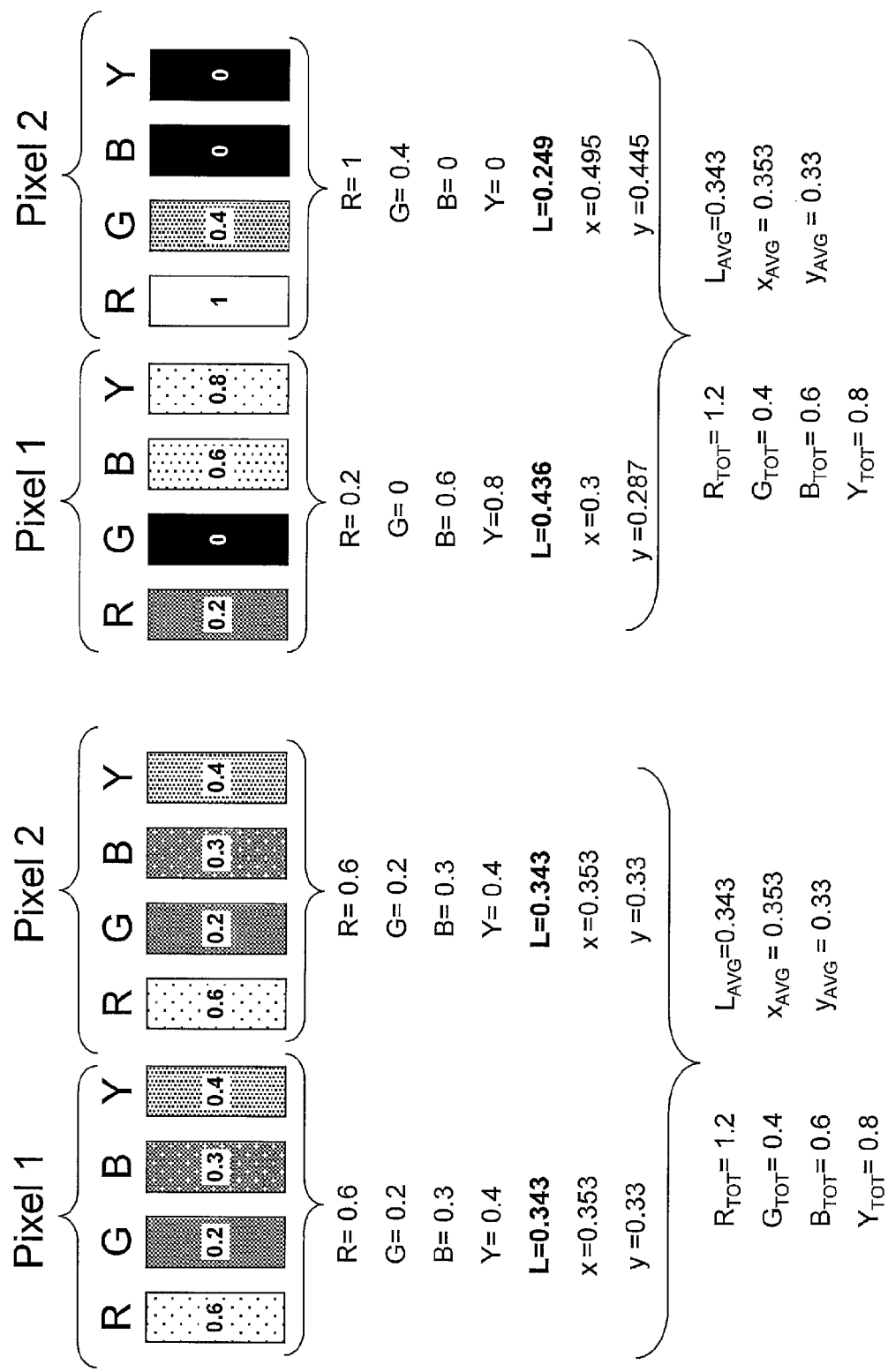
FIG. 10: is a diagram illustrating the pattern of pixel data modifications of an embodiment of the present invention applied an RGBY type multiprimary display with coloured input data.
Figure 11:
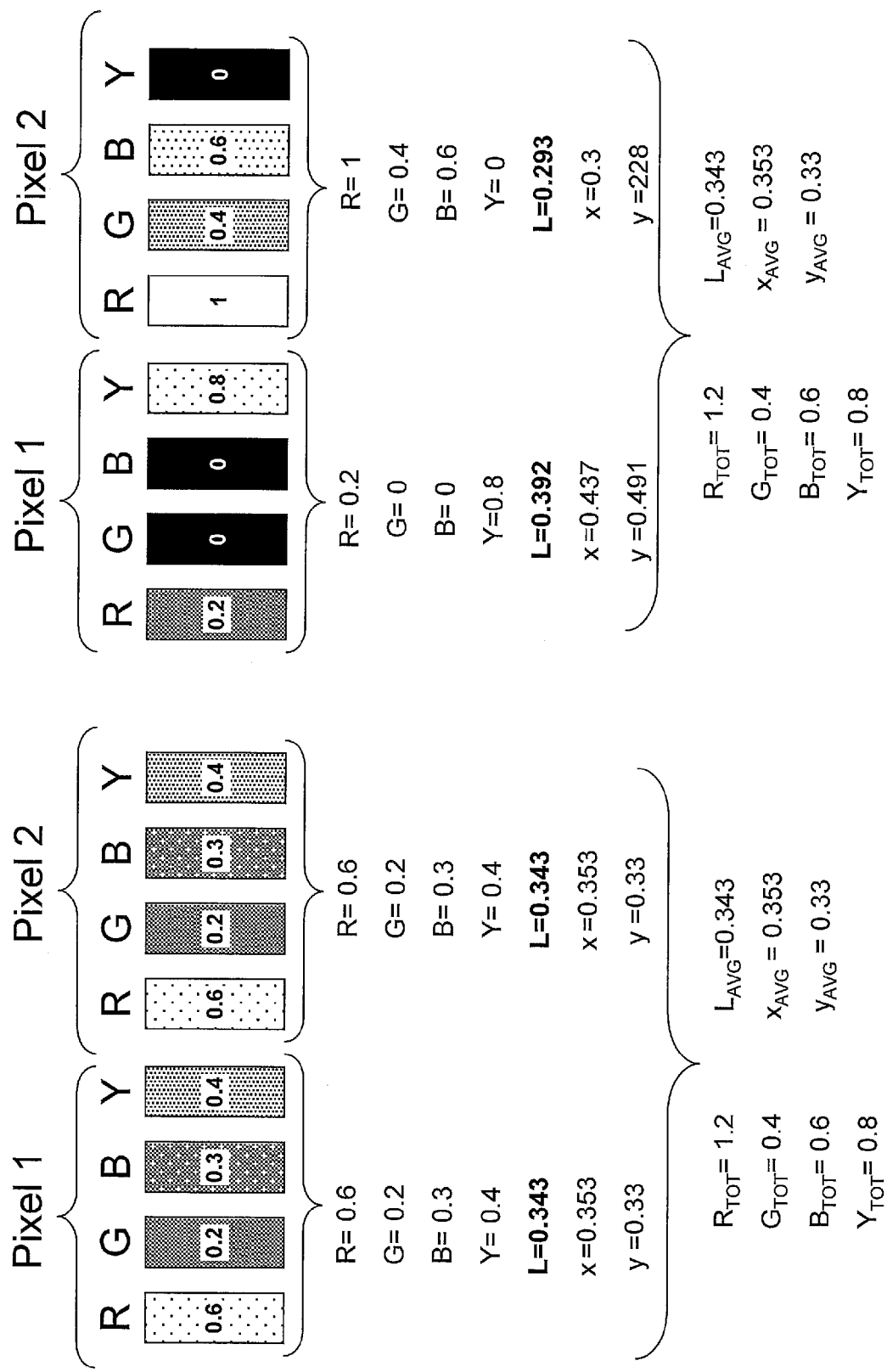
FIG. 11: is a diagram illustrating the pattern of pixel data modifications of an embodiment of the present invention applied to an RGBY type multiprimary display with coloured input data, showing reduced resolution loss resulting from the modifications.

FIG. 10 shows, that for the present embodiment, when the main image input data prescribes the same light skin tone colour as shown in FIGS. 7 and 8, applying the modifications according to the described pattern on an RGBY display will not produce a significantly smaller individual pixel luminance error than the modification for an RGB only display (0.343 to 0.436 or 0.249 is a 9.4% error, compared to the 9.5% for the RGB method). Indeed, for some input colours, a different pattern of modifications, such as increasing the luminance of the R, G and B sub-pixels, and reducing the luminance of the Y sub-pixel in pixel 1, and applying the opposite change in pixel 2 may yield improved results. This is illustrated in FIG. 11, which shows the same light skin tone input modified according to the amended pattern yield an individual pixel luminance error of 4.9%.

In a still further embodiment therefore, the pattern of modifications applied to each pair of pixels may be varied on a pair by pair basis, in order to select the pattern which most closely maintains the individual pixel luminances as prescribed by the main image data for each pair.

It can be seen however, that for some input colours, no pattern of modifications exists which allows the distribution of luminance within each pair of like sub pixels to be concentrated maximally in one sub-pixel of the pair, while maintaining the overall luminance of each whole pixel of the pair. In a still further embodiment, the sub-pixel data modifications are performed as described above to the R, G and B sub-pixels, so as to maximally concentrate the combined luminance of each pair of like sub-pixels in one of the pair. The luminance modification applied to the additional W or Y sub-pixel is then calculated so as to compensate for the change in overall pixel luminance incurred by the change to the R, G and B sub-pixels (or alternatively, for the case of an RGBY display, to compensate for the change in overall pixel luminance incurred by the change to the R and G sub-pixels only).

Figure 12:
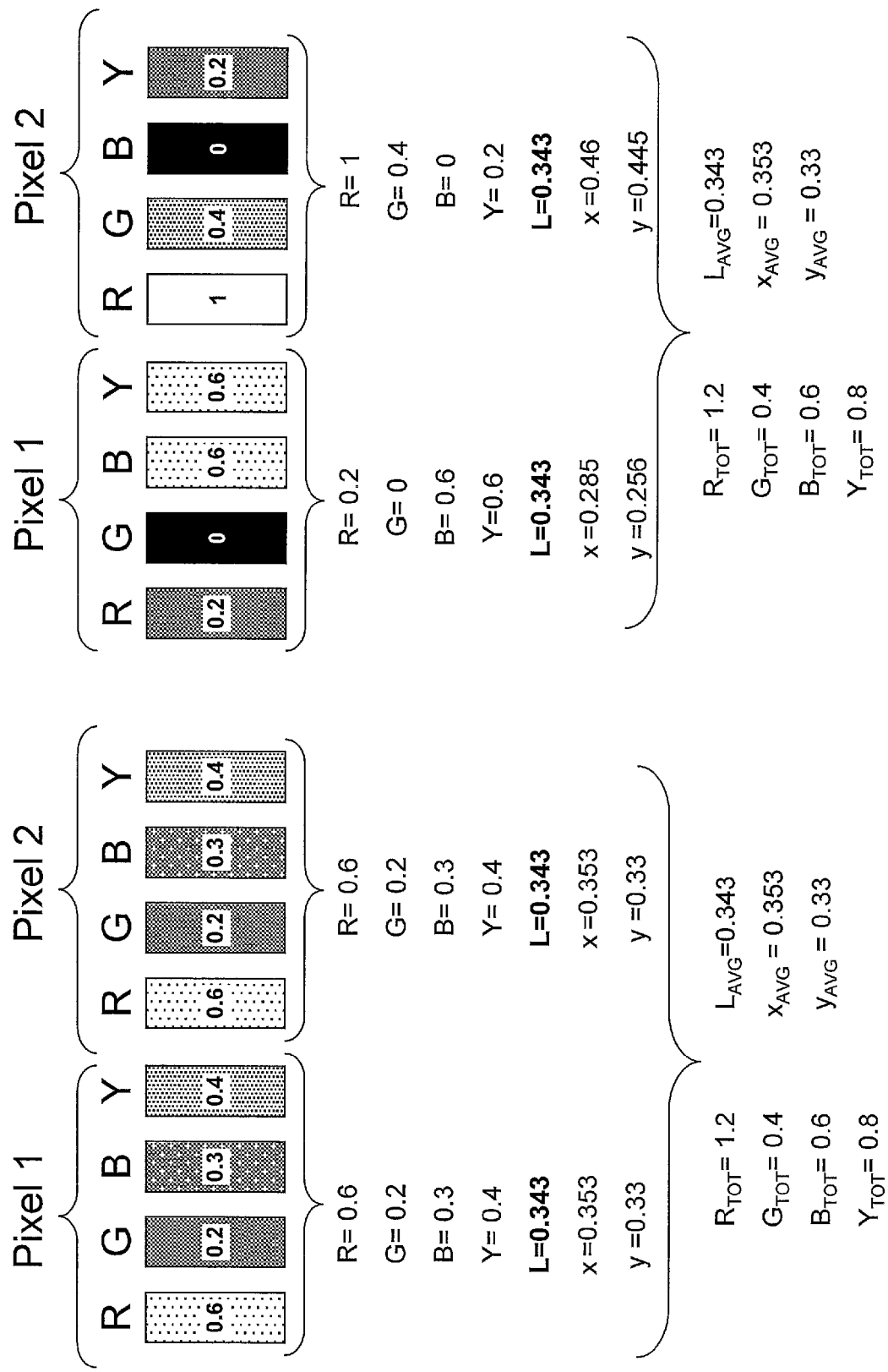
FIG. 12: is a diagram illustrating the pattern of pixel data modifications of an embodiment of the present invention applied to an RGBY type multiprimary display showing no luminance resolution loss resulting from the modifications, but some chrominance resolution loss.

While for input data combinations for which it is not possible to maximally redistribute luminance between like sub-pixel pairs while maintaining overall individual pixel luminance, this will result in a change to the W or Y pixel values which does not maximally redistribute their combined luminance (and therefore does not maximise the privacy strength effect of the processing), it will ensure no resolution loss in the luminance domain is incurred. This is illustrated in FIG. 12, in which the input data of FIG. 10 is modified according the pattern of that FIG. 10, but the redistribution of luminance between the Y sub-pixel of the pair is limited so as to maintain the overall luminance of each individual pixel. It may be noted that the same method may be applied using the pattern of modifications shown in FIG. 11, or indeed any pattern of modifications applied to the three standard primary colour sub-pixels.

It may be the case that of the possible modification pattern applicable to the R, G and B sub-pixels, one will result in a modification to the W or Y sub-pixel according to the present method which results in a stronger privacy effect (i.e. more complete concentration of the combined W or Y pixel luminance within one pixel of the pair) In a further embodiment, the process identifies which pattern of modifications produces the optimum result according to this measure, and selects the be applied to each pair if pixels, on a pair-by-pair basis.

It may be noted that this method has the advantage that if the input data is such that the like sub-pixel luminances can be maximally redistributed for all types of sub-pixel, while maintaining the overall individual pixel luminances, this method will achieve that, i.e. if the input data is as shown in FIG. 6, and the method as illustrated in FIG. 12 is applied, the output data will be the same as shown in FIG. 6. It should also be noted that, while individual pixel luminance is maintained by this method, and therefore luminance resolution loss is prevented, for most colours the overall chromaticity values of the individual pixels will be altered (as shown by the differing x, y values in FIG. 12), though chromaticity will still be maintained over the pair of pixels. This may be acceptable, as the resolution of the human eye to changing chromaticity is greatly reduced compared to its luminance acuity.

It may also be the case that, for some input data colours, after maximal redistribution of the luminance of the R, G, and B pixels, the change in luminance required of the W or Y pixel may be beyond the achievable range (i.e. less than 0 or greater than 1, in the luminance notation used so far). It may be desirable, for simplification of the processing, to simply truncate these "overflow" values, and accept the resulting error in overall pixel luminance. In a further embodiment however, either the amount of luminance overflow is registered and returned to the R, G and B sub-pixels (by further varying the data values for the R, G and B sub-pixels to alter the overall luminance of the R, G and B sub-pixels to take up the "luminance overflow" that the W or Y pixel cannot provide) or the amount of modification applied to the R, G and B sub-pixels is limited to allow full compensation by the W or Y pixel.

In a still further embodiment, if an overflow is registered, a different pattern of modifications to the R, G and B pixels is selected which produces a different overall luminance change, which can be compensated for by changes to the W or Y pixel within the achievable range. It may be the case that, for each pair of pixels being processed, the method identifies the optimum pattern of modifications to the R, G, B and W or Y pixels for both the strength of the privacy effect, as described above, and for minimisation of overall luminance change, or the ability of the W or Y sub-pixels to be altered to compensate for the change in overall luminance applied to the R, G and B sub-pixels. It may however be the case that the sub-pixels are modified according to a standard pattern, and it is only in the case that that an "overflow" value is incurred in the calculation of modified values for the W or Y sub-pixel that other modification patterns are tested.

In a still further embodiment, the W or Y sub-pixel value is truncated, and the "overflow" value required of to maintain the original pixel luminance passed on the next pixel pair, or a another neighbouring pixel pair, to be taken account of in the calculation for that pair, in an error diffusion type process.

Figure 13:
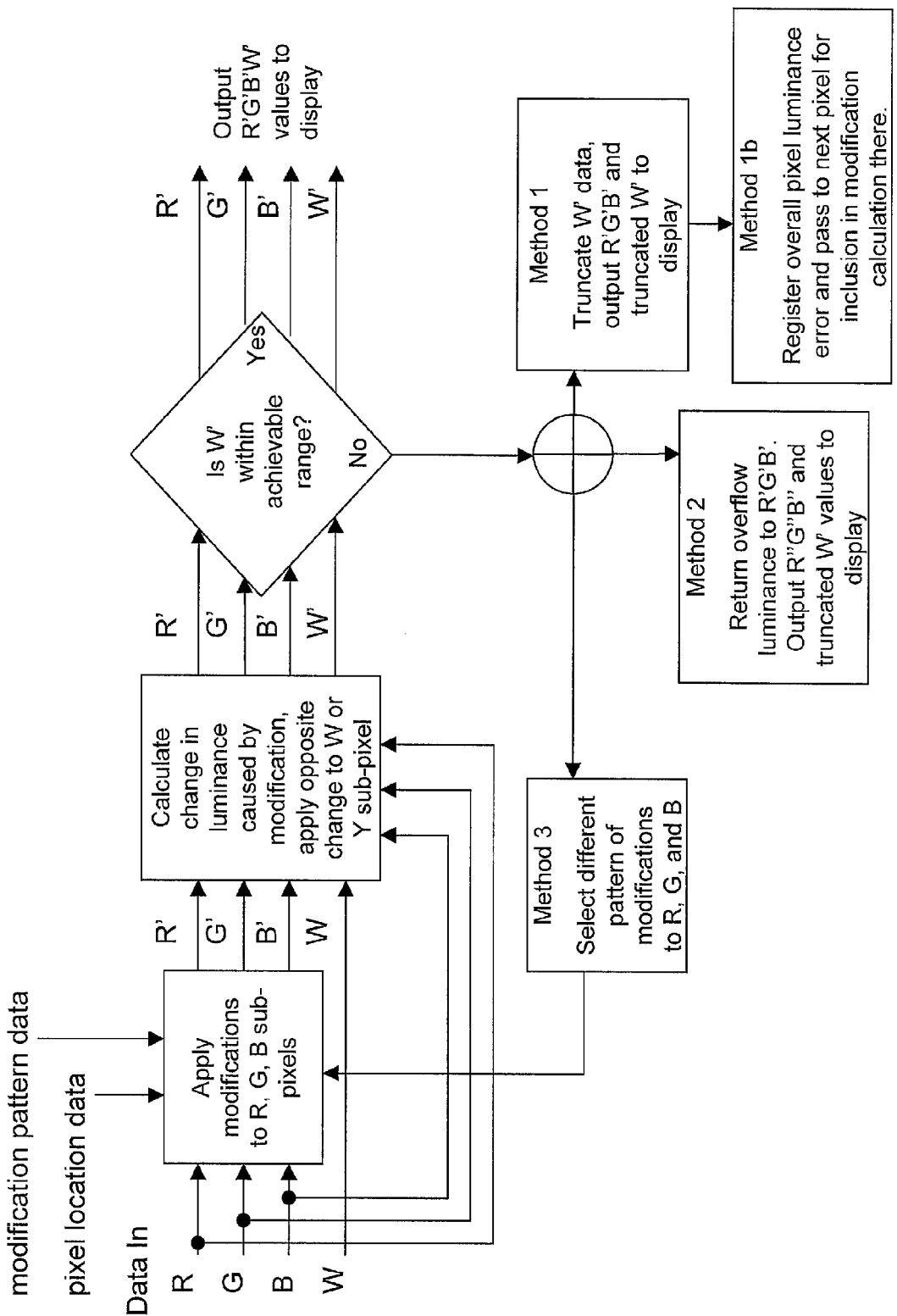
FIG. 13: is a process flow diagram illustrating a possible implementation of embodiments of the present invention.

The process flow of these embodiments is illustrated in FIG. 13.

It may be the case that, for the processes described in the above embodiments, if the input values of the pixels being modified are different for the two pixels in the pair, either the individual overall pixel luminance will not be maintained, or the overall chromaticity values of the pair will not be maintained. In still further embodiments, if the input values of the pixels of a pair differ by an amount exceeding a given threshold, then one of the luminance maintaining processes of the type illustrated in FIG. 13 may be used for these pairs only, while a more simple processing method may be used for the remaining more similar pixel pairs, or if the difference threshold is exceeded, a supplementary check and correction on the overall chromaticity of the pixel pair after modification may be applied. This correction may be similar to the corrections for luminance "overflow" described above, i.e. the registered chromaticity error may be corrected for within the pair of pixels by limiting the degree of modification applied to the individual sub-pixels, or by exchanging luminance between the sub-pixels of different types. Alternatively, the error may be passed on to the calculation for the next pixel pair to be taken account of in the calculation for that pair, in an error diffusion type process.

It should be noted that, while the description of the above embodiments has concentrated on modification to the sub-pixel values which maximally concentrate the luminance of a pair of like sub-pixels in neighbouring pixels in one or the other of the sub-pixels, in order to maximise the strength of the privacy effect, it may also be the case that, depending on the side image data, a less than maximal redistribution may provide a more accurate match to the desired side image luminance at the corresponding position in the image. Indeed, WO2009110128A1 details a method using four pre-calculated degrees of modification for each input value to process images allowing four different off-axis brightnesses for each colour channel. All of the embodiments described herein could equally apply to methods in which varying degrees of modification are used to control off-axis image appearance.

In a still further embodiment, the intended position in a particular colour space, e.g. the CIEXYZ or CIELAB spaces for each pixel according to both the main image and side images is determined according to the main and side image input data. The combination of R, G B and W or Y sub-pixels which best satisfies the required positions in both images is selected. This method may be implemented in several different ways.

Figure 14:
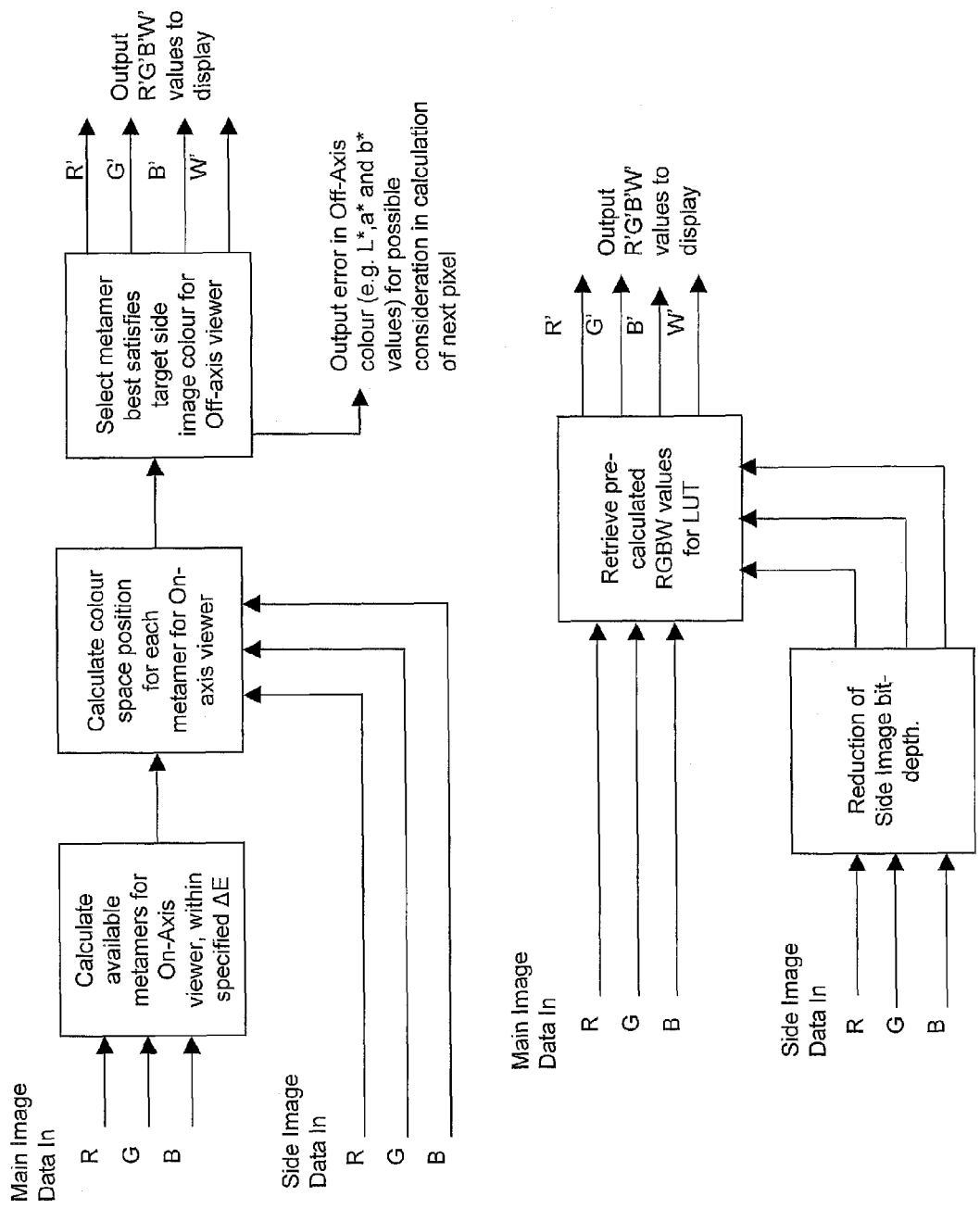
FIG. 14: is a process flow diagram illustrating two possible implementations of an embodiment of the present invention.

For each pixel in the display, a calculation may be performed in order to select the best combination of sub-pixel data values to satisfy both the main and side image requirements as the main and side image data is input to the display. In order to operate at video rate, this calculation would have to be fast however, and the number of sub-pixel data value combination to be considered may be prohibitive. It may be more practical to pre-calculate the On-axis and Off-axis colour space positions for each combination of R, G, B and W or Y Sub-pixel data values and store these results in a LUT for retrieval according to the main and side image data as this data is input to the display. However, again due to the number of sub-pixel data value combinations, the memory required for storage of such an LUT may be prohibitive. Process flows of these possible implementations are shown in FIGS. 14 (*a*) and (*b*) respectively. It may be even more practical to perform a calculation which, for each set of R, G and B sub-pixel data input to the panel, the set of available metamers for the On-Axis viewer is calculated, and the metamer which also best satisfies the side image colour requirements is selected from this set. The method of calculation of metamers may be similar to that described in US20100277498A1. It may also be the caser that, if a certain amount of tolerance is allowed in the colour space values of the calculated available metamers, than an increased set of metamers may be available for each combination of R, G and B main image sub-pixel input data, and therefore a better match to the Off-Axis colour space position required by the side image data may be found. This degree of tolerance may be specified according to the Euclidean distance in the colour space between the ideal position according to the input data, and the actual position of each metamer. Such colour difference measures are well known for several colour spaces, such as the "Delta E" calculation in CIELAB colour space:

$$\Delta E = \sqrt{(L_1-L_2)^2+(a_1-a_2)^2+(b_1-b_2)}. \quad \text{[Math.1]}$$

Again, in the case that of the available metamers for selection, there are none which produce the target Off-Axis colour according to the side image data to within a satisfactory error, the best available metamer may be selected and the corresponding R', G' B' and W' or Y' data values output to the panel, while the difference between the target and output metamer colour values may be stored, for inclusion in the calculation for the next, neighbouring pixel, in an error diffusion type process.

It should be noted that, in the above examples and associated figures, the pixel layout for the multiprimary display has been assumed to be of an RGBX stripe configuration, i.e. each pixel of the display consists of one each of an R, G, b ad n W or Y type sub-pixel, in a side-by side arrangement, and that all pixels of the display have the same arrangement of sub-pixels. The methods described above are equally applicable to multiprimary displays in which the sub-pixel arrangement in each pixel is different from this, e.g. pixels with a 2×2 arrangement of sub-pixels are possible, as opposed to 4×1 stripe arrangements. Both 2×2 and 4×1 arrangements are also possible, in which the ordering of the R, G, B and W or Y pixels differs in some pixels compared to others, e.g. an (R, G, B, W), (R, W, B, G) pattern may be utilised. It may be that some of these patterns may be more advantageous than others for the application of the methods described herein, in terms of the macroscopic appearance of the modified pixel data, but application of the methods described to all possible sub-pixel arrangement patterns should be considered within the scope if this invention.

The methods of this invention are also applicable to multiprimary displays in which not all pixels of the display comprise one of each type of sub-pixel, or in which data is rendered onto the display with sub-pixel resolution. Examples of such displays, in which some types of colour sub-pixel are alternated spatially in the display pixels, or are shared between neighbouring pixels, and therefore the chromaticity resolution of the panel is different to the luminance resolution, are described in IMID'05 Digest pp 867-872 and the SID'08 Digest, pp 1112-1115, and are commonly known as "Pentile" type displays. Pentile type displays with a number of different configurations have been proposed and utilised on display devices, such an RGBW type Pentile patterns and RGBG type Pentile patterns.

Figure 15:
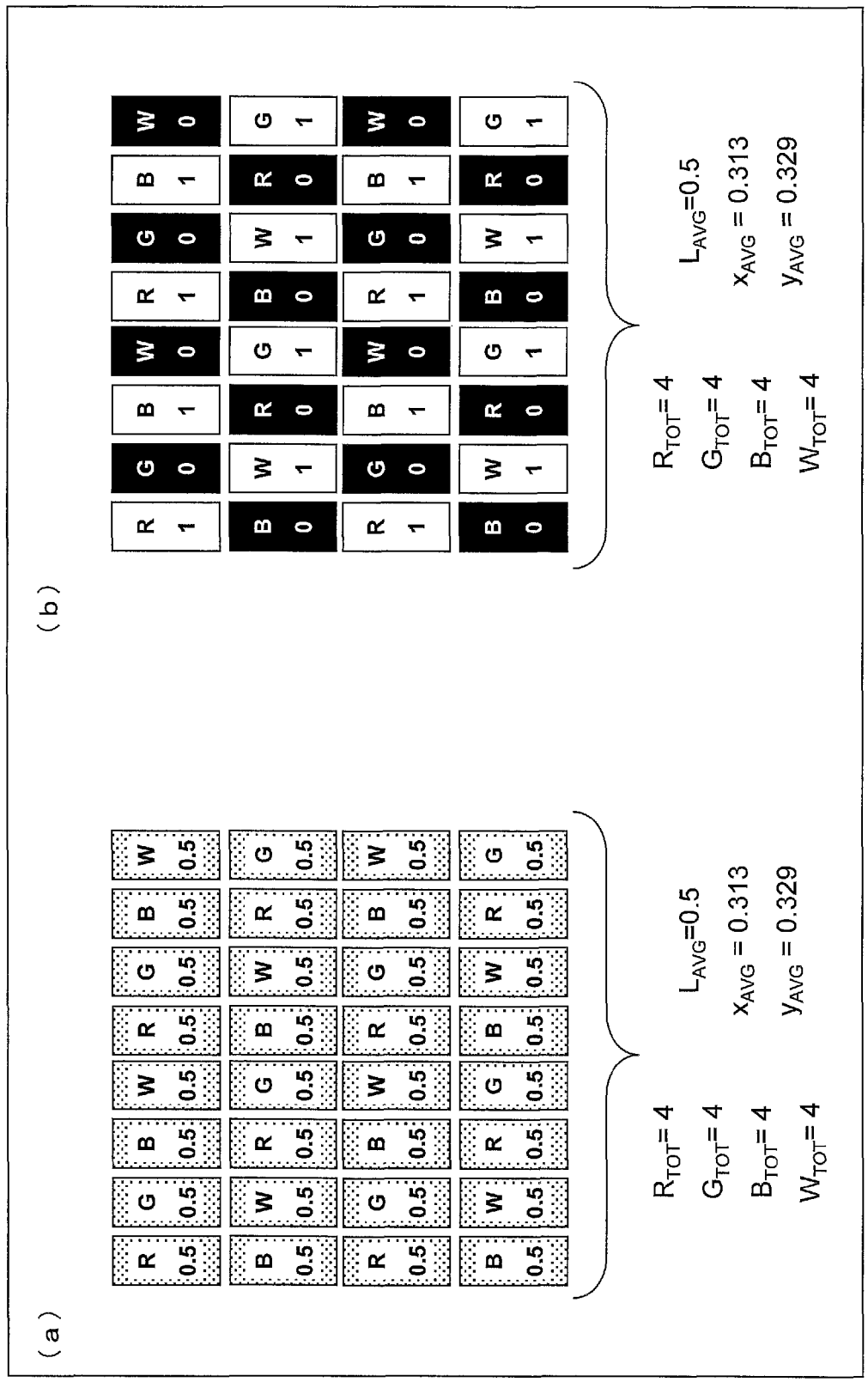
FIG. 15: is a diagram illustrating the pattern of pixel data modifications of an embodiment of the present invention applied to a Pentile type display.

In the case of the present methods being utilised on such a display, pairs of neighbouring sub-pixel of the same type may be identified for transfer of luminance between the two sub-pixels in the pair, even though the two may not be in what the display considers to be neighbouring whole pixel regions. The pattern of achieving this which is most straightforward (luminance transferred between pairs of nearest like sub-pixel types) and which results in a bright-dark sub-pixel pattern of the highest spatial frequency, and therefore smoothest macroscopic appearance, is shown in FIG. 15, for uniform mid-grey main image data (a) and the same input data modified to produced a dark side-image appearance (b). As the data with the figure shows, the overall individual sub-pixel luminances are maintained though the modifications, so the macroscopic appearance to the on-axis viewer 3, e.g. overall luminance and chromaticity co-ordinates, will remain unaltered.

Figure 16:
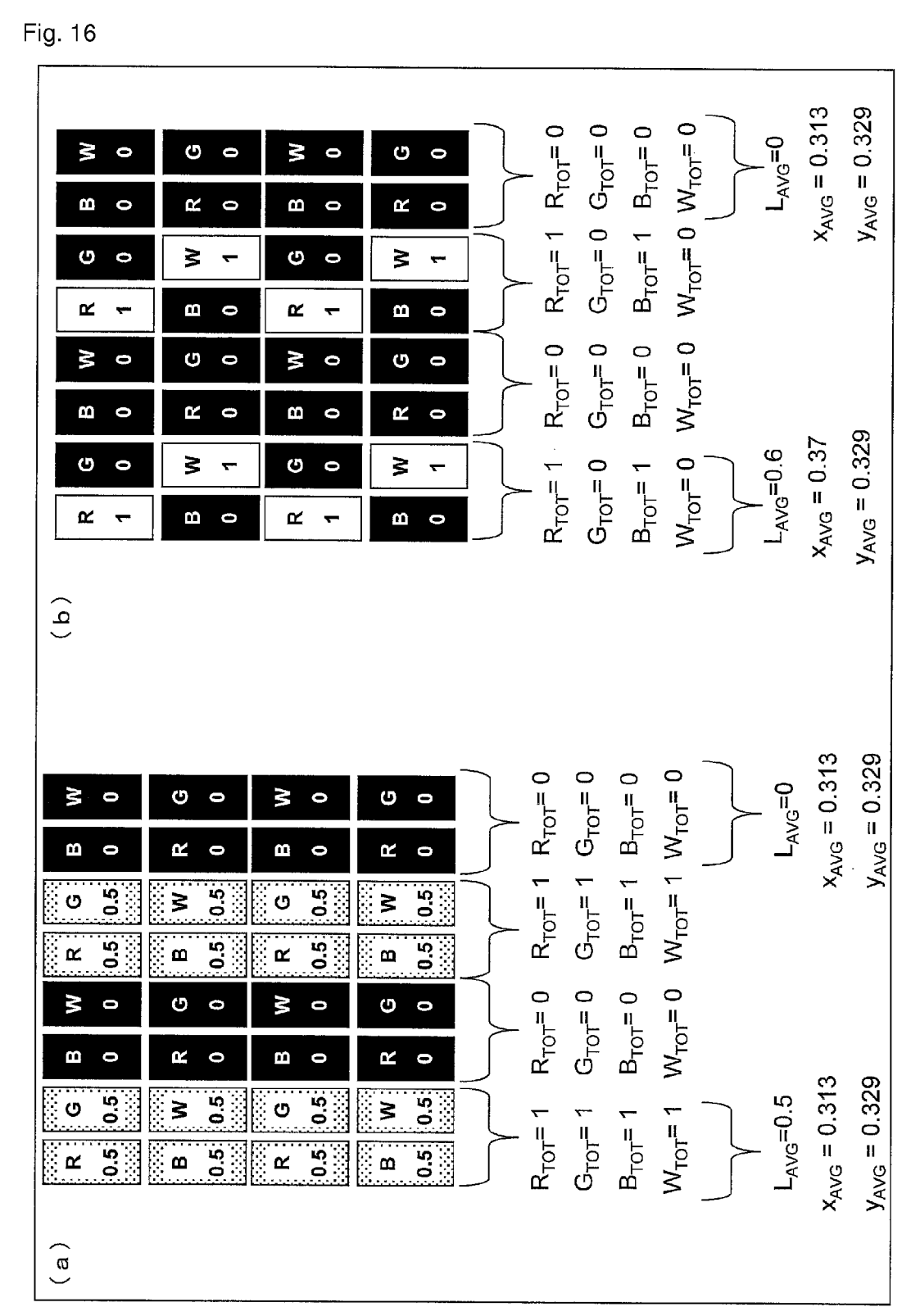

However, if the pixel data modifications are made in this manner, and the main image consists of data rendered at a sub-pixel level, then colour artefacts can occur. This is illustrated in FIG. 16, which shows black and grey vertical lines of two sub-pixel widths each. It can be seen from the figure that, despite the lines in the input image being less then the combined width of all the sub-pixel types, a neutral colour is maintained within both the bright and dark lines. After modification according to the pattern shown in FIG. 15 however, the bright lines are made coloured, which is undesirable. The same would also be true if the input main image comprised horizontal black and grey lines of the shortest possible pitch, one sub-pixel width.

Figure 17:
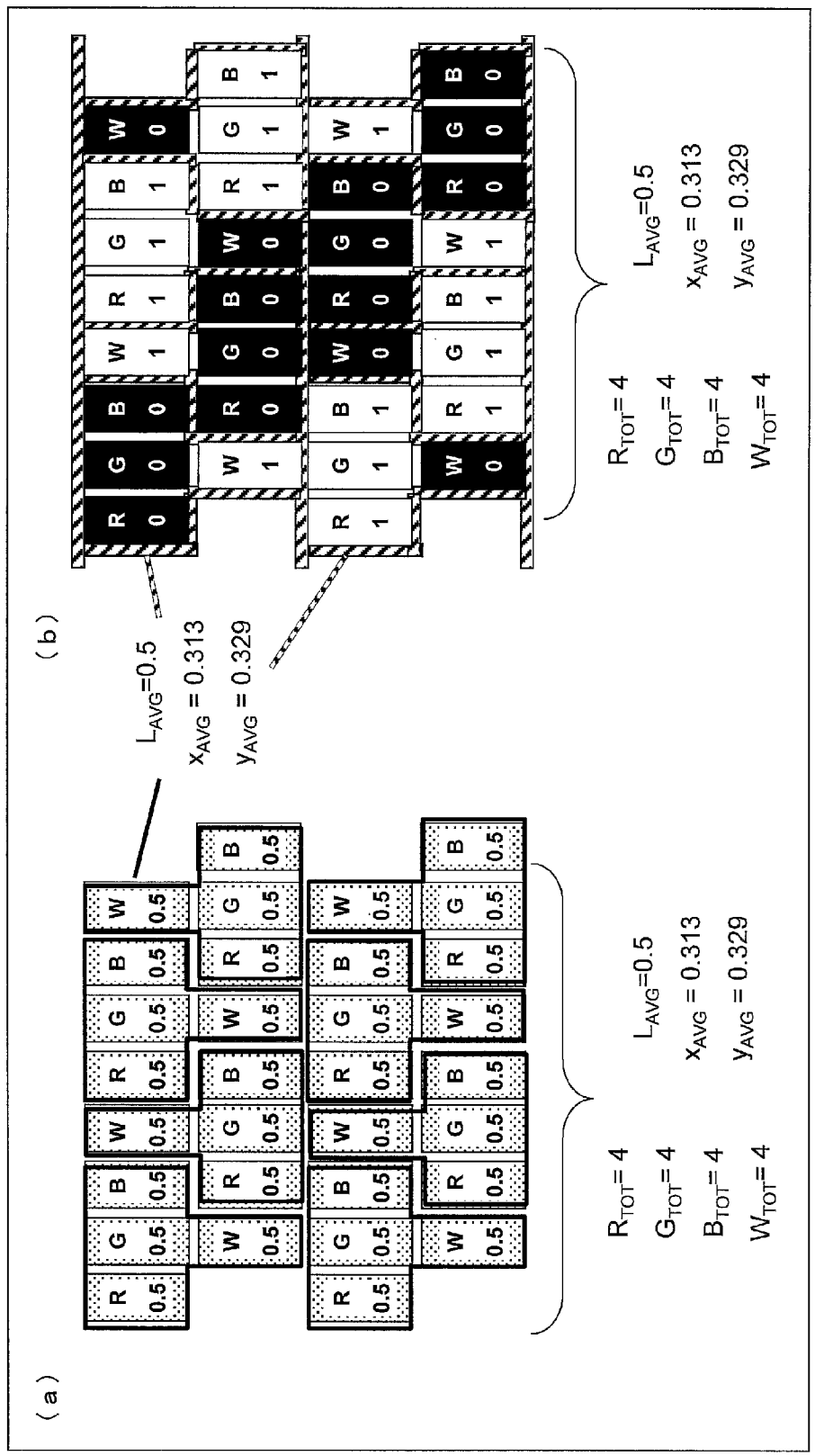
FIG. 17: is a diagram illustrating the pattern of pixel data modifications of a further embodiment of the present invention applied to a Pentile type display.

In a further embodiment which avoids this problem, for Pentile type displays, a grouping of colour sub-pixels containing one of each type is defined for the purposes of the privacy processing, even if such a grouping does not constitute one conventional white pixel in the display. Such a grouping is illustrated in FIG. 17. Image data modifications are then applied which maintain the overall luminance of the grouping, as previously described and illustrated in FIGS. 6 to 12. FIG. 17 also shows that, for a uniform grey input main image, after modification according to the above described method, the overall luminance and chromaticity co-ordinates, both of individual pixel groupings and of larger areas, remain the same. The resulting pattern of bright and dark sub-pixels is coarser than that of FIG. 15, although it is no coarser than a chequer pattern of bright and dark whole pixels, so is unlikely to be visible to the on-axis viewer 3.

Figure 18:
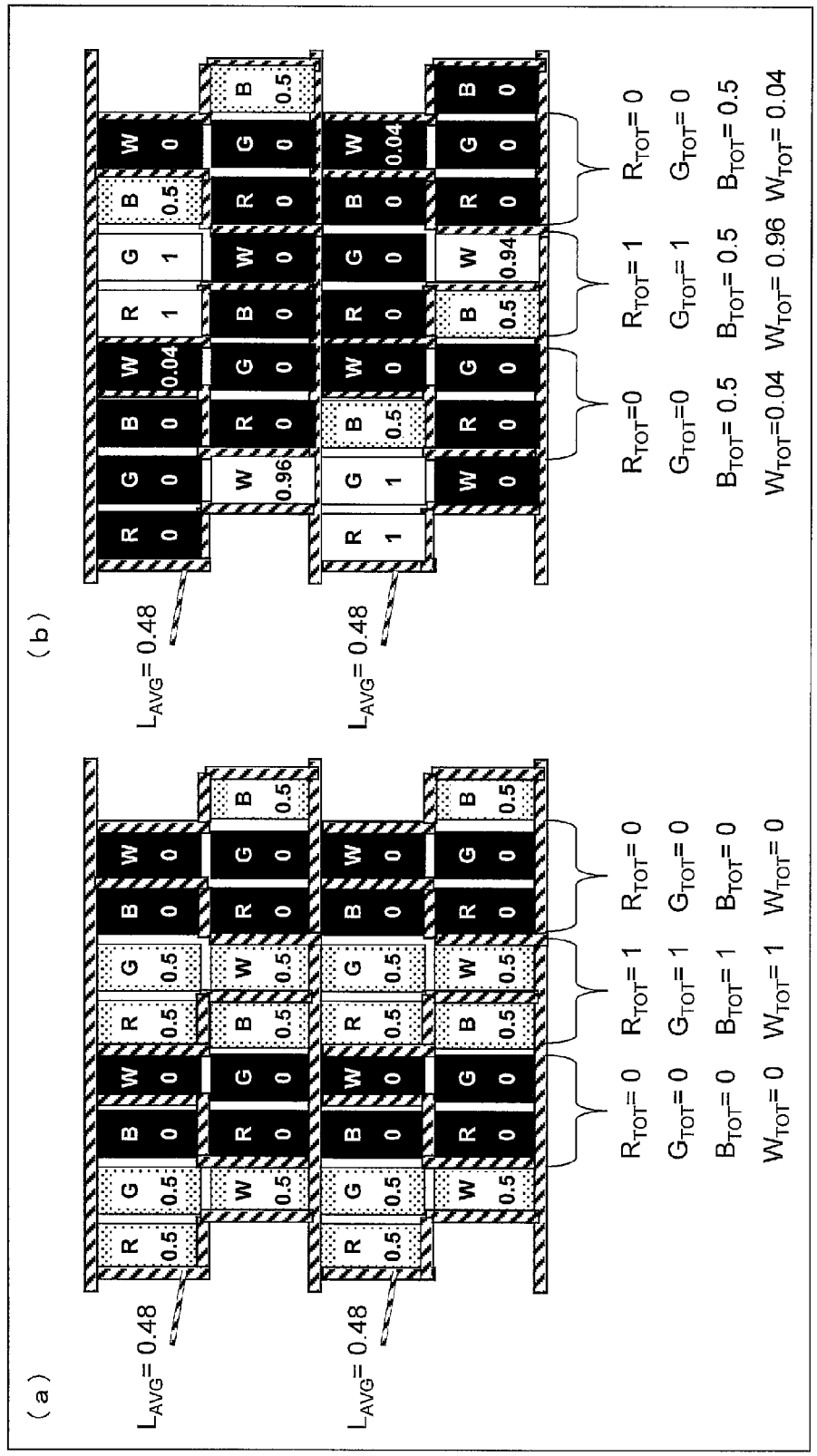
FIG. 18: is a diagram illustrating the pattern of pixel data modifications of a further embodiment of the present invention applied to a Pentile type display with high spatial frequency input data.
Figure 19:
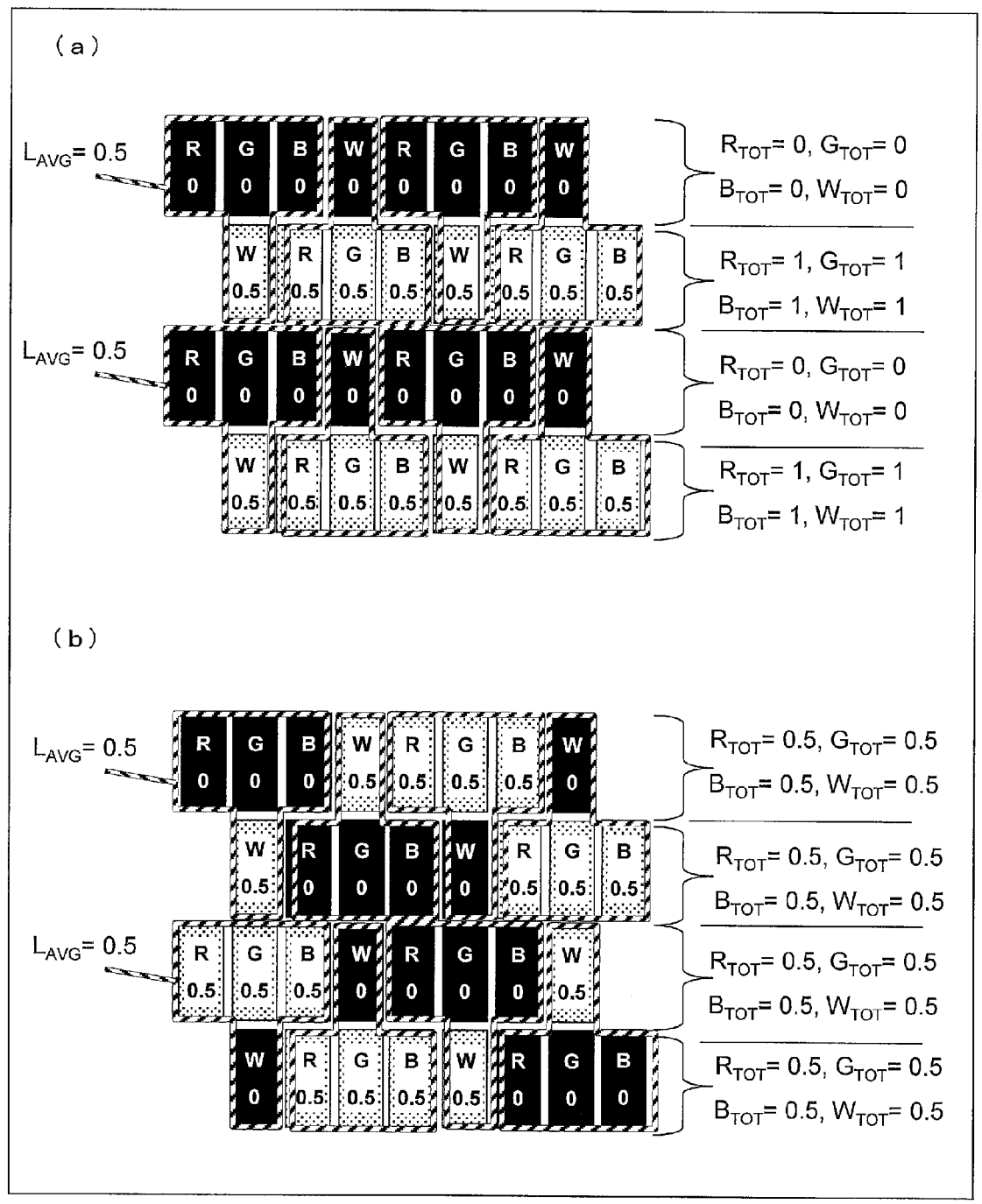
FIG. 19: is a diagram illustrating the pattern of pixel data modifications of a further embodiment of the present invention applied to a Pentile type display with high spatial frequency input data.

In the case of the input main image comprising maximum spatial frequency vertical lines, this method results in a much improved retention of the initial high-spatial frequency pattern, while still allowing near-maximal alteration of the individual sub-pixels values except the blue type. This is shown in FIG. 18. The resulting effect for a high horizontal resolution input image is very poor however, with the processing resulting in an effective erasing of the horizontal line information, and no change to individual sub-pixel data levels, as shown in FIG. 19.

Figure 20:
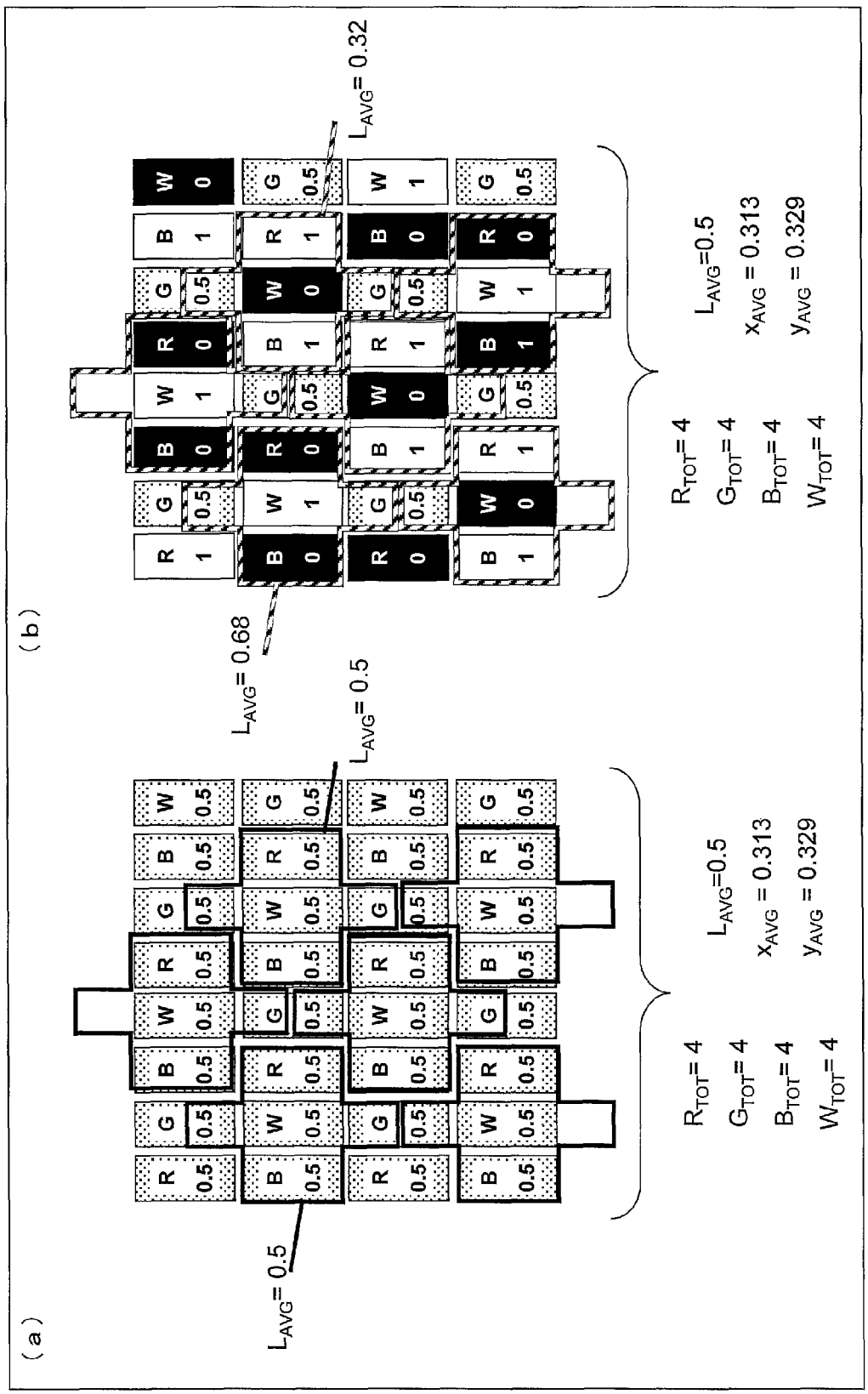
FIG. 20: is a diagram illustrating the pattern of pixel data modifications of a still further embodiment of the present invention applied to a Pentile type display.
Figure 21:
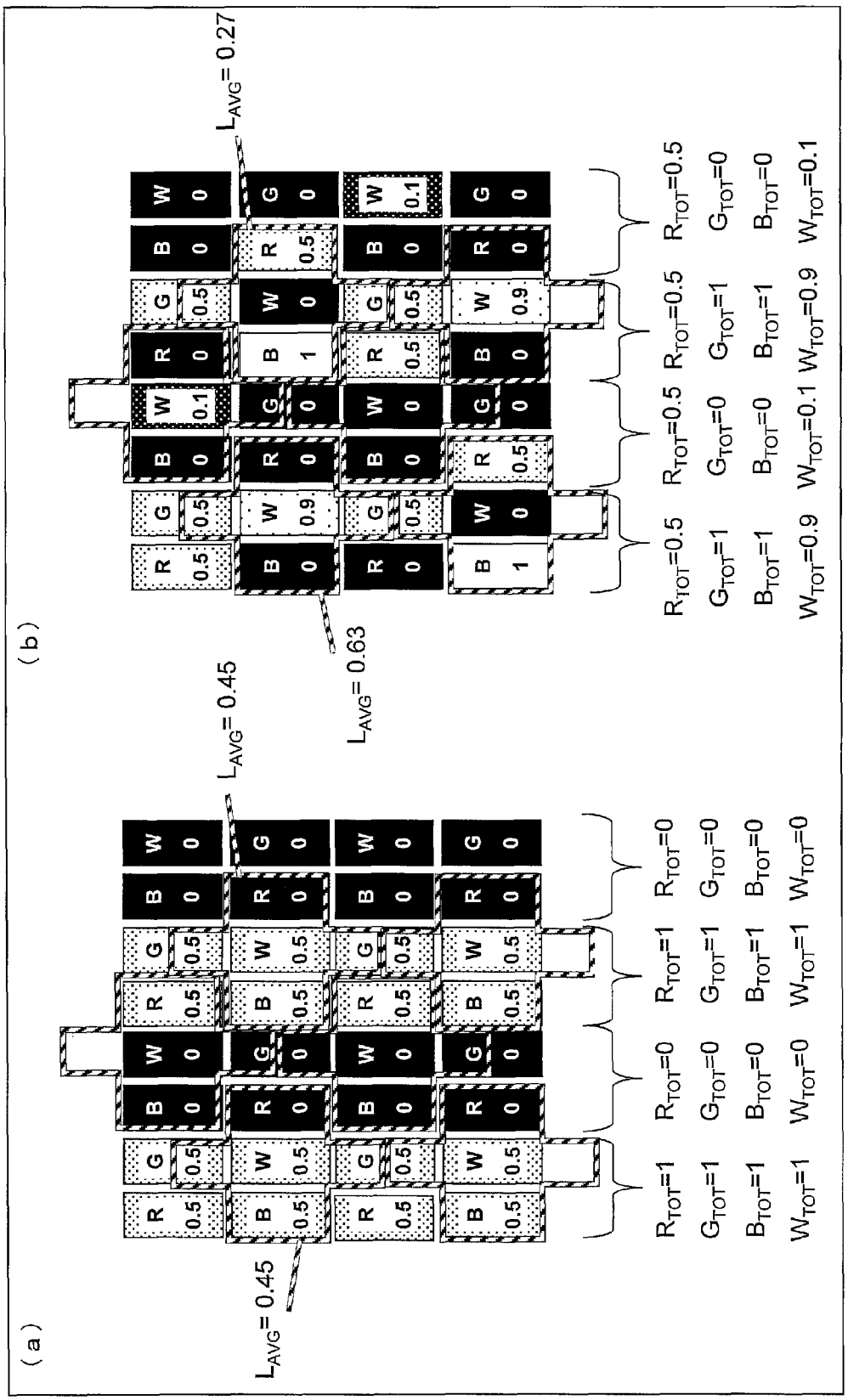
FIG. 21: is a diagram illustrating the pattern of pixel data modifications of a still further embodiment of the present invention applied to a Pentile type display with high spatial frequency input data.

In a further embodiment, a "virtual" grouping of each of the sub-pixel types is defined for the purposes of the privacy processing. Such a virtual grouping may comprise portions of two or more sub-pixels of one or more types, to collectively represent one whole sub-pixel. Such groupings are illustrated in FIG. 20. In the example of the figure, each grouping comprises a red, blue and white sub-pixel, and two halves of two green-sub pixels of the display. Image data processing according to the above described method, on a uniform grey input image region (shown in FIG. 20 (a)), results in the pattern shown in FIG. 20 (b). As can be seen this method has the advantages that the "centre of mass" of luminance of each grouping is better maintained, and a fine spatial pattern results from the data modifications (shown in FIG. 20 (b)), although the green sub-pixels do not have any modification applied due to them being shared between different groupings. FIG. 21 shows the improved performance of this pattern for high spatial frequency vertical lines in the input main image data, over the pattern of FIGS. 17-19, although the sharpness and colour of the lines is not perfectly preserved after modification Similar improvement is also achieved for horizontal lines.

Figure 22:
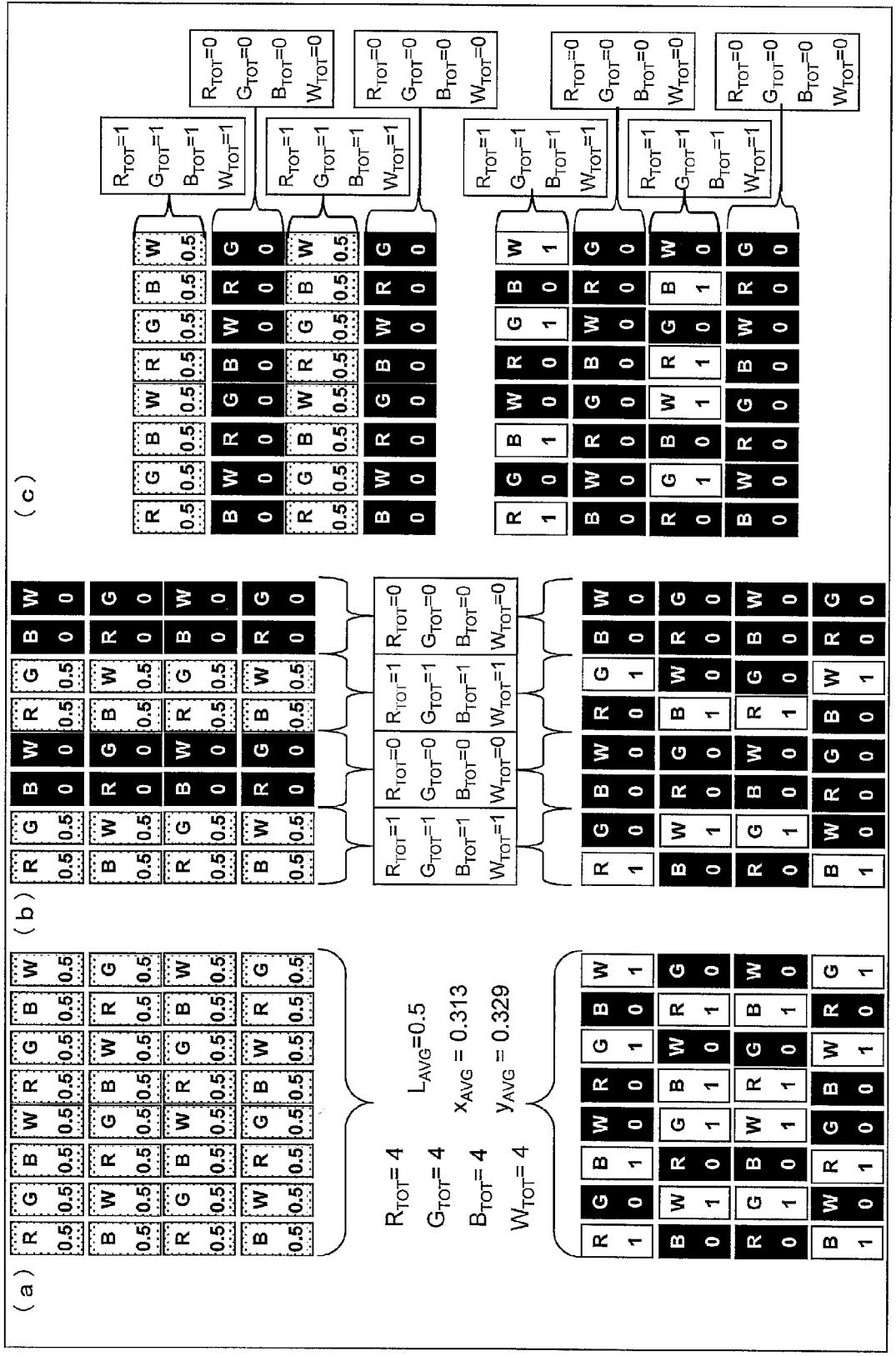
FIG. 22: is a diagram illustrating the pattern of pixel data modifications of a still further embodiment of the present invention applied to a Pentile type display, with uniform, and high spatial frequency input data.

In a still further embodiment, the privacy processing is implemented on a Pentile type display and the pattern of modifications applied is the shown in FIG. 22 (a) for uniform grey input main image data. This pattern consists of straightforward transfer of luminance between near like sub-pixels, as in the pattern of FIG. 15, but in this instance, the direction of luminance transfer is altered for each grouping of all sub-pixel types every grouping in the vertical direction, but every two groupings in the horizontal direction. E.g. if a 2×2 grouping of one each for the R, G, B and W sub-pixels has the B and G sub-pixels made brighter, and the R and W sub-pixel made darker, then the 2×2 grouping to the right of that one may have the same result of the modifications, while the 2×2 grouping to the right of that, and the 2×2 grouping below the first 2×2 grouping may have the opposite modifications applied.

The advantages of this pattern are shown in FIG. 22 (b and c), which show that the data modification may be applied as described to each sub-pixel in isolation, assuming the neighbouring sub-pixel is of equal input data value, and when the input main image data comprises either vertical (b) or horizontal (c) stripes, the pattern of modifications preserves the overall luminance and chromaticity of each line region, while allowing maximal change to be applied to the sub-pixel data values. This pattern will therefore allow a strong privacy effect, with no blurring or false colouring of high-spatial frequency input data. Only if the input data consists of a pattern matching the pattern of modifications (e.g. a 1×2 pixel chequer pattern) will a problem occur. The embodiment may therefore include a filtering step for the input main image data to detect this type of input pattern and either apply a blur to detected regions, or alter the pattern of modification to prevent image artefacts.

In a still further embodiment, the pattern of image data modifications may be reversed or otherwise altered temporally, as well as spatially in the image. For example the pattern may be reversed every frame or second frame at the video display rate. In this way, any visibility of the resulting modification patterns, particularly on low pixel resolution displays may be reduced. In these cases, the magnitude of the data modifications may also be calculated to take into account the switching response of the LC display, to ensure the desired overall luminance and chromaticity is produced by each image region of the display despite the rapidly switching pixel data values.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

A first aspect of the invention provides a method of processing image data for display on a display device, the display device comprising a multi-primary image display panel, the method comprising: receiving image data constituting an image for display on the image display panel; and in a first mode, determining signal voltages to be applied to sub-pixels of the image display panel from the received pixel data and from a secondary data value for the pixel thereby to generate luminance variations perceivable at a first viewing position but substantially not perceivable at a second viewing position.

This mode of operation of the display device provides a private (narrow-view) display mode for the multi-primary image display panel (which is a display panel having pixels or sub-pixels of more than the standard three primary colours such as, for example, an RGBW or RGBY image panel). The luminance variations generated as a result of the secondary data values serve to obscure the image that would be generated if the received image data were the sole input, so that a viewer at the first viewing position (for example position 5 in FIG. 2) which is outside the intended viewing range in the private mode (the narrow viewing range 6 in FIG. 2) cannot make out the image, or can only see a degraded version of the image, owing to the superposed luminance variations. A viewer at the second viewing position (for example position 3 in FIG. 2) which is inside the intended viewing range in the private mode perceives little or no luminance variations, and so sees the original image (that is, the image that would be generated if the received image data were the sole input) with little or no degradation in image quality.

Figure 4:
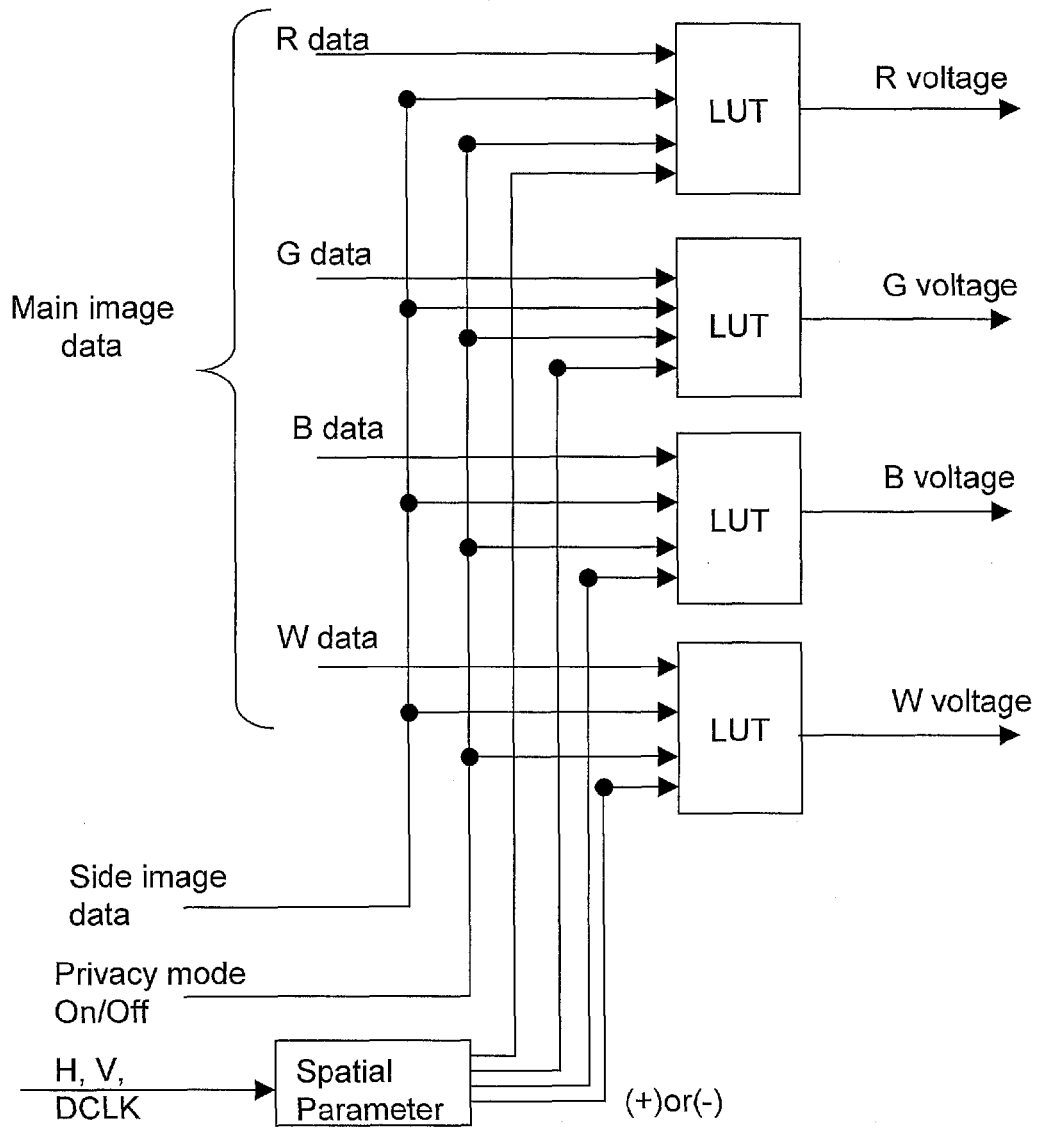
FIG. 4: is a schematic illustrating how a portion of the control electronics of an embodiment for an RGBW type display may be implemented in an electronic circuit.

The method may comprise, in a second mode, determining signal voltages to be applied to sub-pixels of the image display panel from the received pixel data thereby to generate an image perceivable at the first viewing position and at the second viewing position. This mode provides a wide-view (public) display mode. Switching between the first (private) mode and the second (public) mode may be effected by, for example, use of a "Privacy mode On/Off" signal as shown in FIG. 4.

The method may comprise, in the first mode, determining signal voltages to be applied to sub-pixels of the image display panel so as to minimise a change in overall luminance of a pixel to a viewer at the second viewing position. This minimises degradation of the image seen at the second viewing position. By a "change in luminance to a viewer at the second viewing position" is meant the difference in luminance seen by the viewer in the first mode for different values of the secondary data value being applied, i.e. the dependence of the luminance of a pixel to a viewer at the second position on the secondary data value).

The method may comprise, in the first mode, determining signal voltages to be applied to sub-pixels of the image display panel such that the signal voltage for a first sub-pixel of a first pixel of the image display panel is changed in an opposite direction to the signal voltage for a second sub-pixel of the first pixel. Referring to a signal voltage for a sub-pixel being "changed" means that the signal voltage generated for a sub-pixel in the first mode for one value of the secondary data values not the same as the signal voltage that would have been generated for that sub-pixel in the first mode for a second value of the secondary data value, and a "change" in the signal voltage for a sub-pixel refers to the difference between the signal voltage generated for a sub-pixel in the first mode subject to one secondary data value and the signal voltage that would be generated for that sub-pixel in the first mode for a second value of the secondary data value (for the same main image data).

The image display panel may be an RGBW image display panel and the method may comprise, in the first mode, determining signal voltages such that the signal voltage for a white sub-pixel of the first pixel is changed in an opposite direction to the signal voltages for red, green and blue sub-pixels of the first pixel.

The image display panel may bean RGBY image display panel and the method may comprise, in the first mode, determining signal voltages such that the signal voltage for a yellow sub-pixel of the first pixel is changed in an opposite direction to the signal voltages for at least red and green sub-pixels of the first pixel.

The method may comprise, in the first mode, determining signal voltages to be applied to sub-pixels of the image display panel such that the signal voltage for a first sub-pixel of a second pixel of the image display panel is changed in an opposite direction to the signal voltage for a first sub-pixel of the first pixel, the first pixel being adjacent to the second pixel.

The method may comprise determining signal voltages to be applied to sub-pixels of the image display panel separately for each pixel pair.

The method may comprise, in the first mode, determining the signal voltage to be applied to a sub-pixel having the greatest luminance contribution so as to compensate for differences in luminance of other sub-pixels between the first mode and the second modes.

The method may comprise, in the first mode, determining the signal voltage to be applied to a white sub-pixel so as to compensate for differences in luminance of red, green and blue sub-pixels between the first mode and the second modes.

The method may comprise, in the first mode, determining the signal voltage to be applied to a yellow sub-pixel so as to compensate for differences in luminance of red, green and blue sub-pixels between the first mode and the second modes, or to compensate for differences in luminance of red and green sub-pixels between the first mode and the second modes.

The method may comprise, in the first mode, determining signal voltages to be applied to sub-pixels of the image display panel thereby to substantially maximise luminance variations perceivable at the first viewing position.

The method may comprise, in the first mode: determining signal voltages to be applied to sub-pixels not having the greatest luminance contribution; determining the signal voltage to be applied to a sub-pixel having the greatest luminance contribution so as to compensate for differences in luminance of other sub-pixels between the first mode and the second modes; checking whether the determined signal voltage to be applied to a sub-pixel having the greatest luminance contribution exceeds a threshold voltage; and, if the determined signal voltage exceeds the threshold, setting the signal voltage to be applied to the sub-pixel having the greatest luminance contribution to be equal to the threshold voltage.

The method may comprise, if the determined signal voltage to be applied to a sub-pixel having the greatest luminance contribution exceeds the threshold, taking this into account when determining signal voltages to be applied to sub-pixels of a subsequent pixel.

The method may comprise, in the first mode: determining signal voltages to be applied to sub-pixels not having the greatest luminance contribution; determining the signal voltage to be applied to a sub-pixel having the greatest luminance contribution so as to compensate for differences in luminance of other sub-pixels between the first mode and the second modes; checking whether the determined signal voltage exceeds a threshold voltage; and, if the determined signal voltage exceeds the threshold, re-determining the signal voltages to be applied to sub-pixels not having the greatest luminance contribution.

The method may comprise, in the first mode, determining whether the difference in pixel data between two pixels exceeds a threshold; if so, determining whether the signal voltages determined for the sub-pixels of the pixels lead to a change in overall chrominance of the two pixels have been modified; and if so, re-determining the signal voltages determined for the sub-pixels of the pixels to reduce the change in overall chrominance of the two pixels, while leaving the overall luminance in each pixel unchanged. Again, the term "change in overall chrominance" refers to the difference between the chrominance that would be generated by applying the signal voltages determined in the first mode with one possible value of the secondary data value and the chrominance that would be generated by applying the signal voltages that would be determined in the first mode with a different possible value of the secondary data value (for same image data).

The method may further comprise, if the determined signal voltages to be applied to the sub-pixels result in a change in chrominance, taking this into account when determining signal voltages to be applied to sub-pixels of a subsequent pixel.

The method may comprise, in the first mode, determining whether the difference in pixel data between two pixels exceeds a threshold; and applying a method as defined above to the two pixels only if the difference in pixel data between the two pixels exceeds the threshold. The "pixel data" for a pixel are the set of input values for the sub-pixels of that pixel, so determining whether pixel data for two pixels differ by more than a threshold value may for example involve determining whether any of the input values for each colour differ by more than a threshold, or whether e.g. at least two or more of the inputs for like sub-pixels differ by more than a threshold. Alternatively, it may involve the determining whether some calculated value of an overall difference between two pixels, for example based on weighted differences between the inputs for like sub-pixels of the two pixels, exceeds a threshold.

The method may comprise, in the first mode: determining colour space values for a pixel for the pixel data for that pixel; determining colour space values for the pixel for the secondary data value for that pixel; and determining signal voltages to be applied to sub-pixels of the pixel on the basis of the colour space values.

The method may comprise: for a group of pixels in the image, calculating metamers for the pixels which have, to within an error threshold, the same average luminance and chrominance and which have the same individual luminance for each pixel in the group as the input data; and selecting one of the metamers based on the calculated luminance variations perceivable in the first part of the first viewing angle range for the metamers.

The previous method (that is, involving the determination of colour space values) determines output voltages for each pixel based on inputs for that pixel only. In contrast, this method considers inputs from more than one pixel and this allows greater scope for luminance redistribution by requiring only that the luminance of individual pixels is accurate (that is, each individual pixel has the luminance that would be given by the input mage data in the absence of the secondary data). The chrominance of individual pixels may be chosen freely, as long as the average chrominance of the pixels is accurate. Thus, as an example it is possible to calculate metamers for a pair of pixels, or for a block of 4 pixels—the individual pixels are restricted to having the correct luminance, but the chrominance is restricted only in that the average chrominance for the pair of pixels, or for the block of 4 pixels, is correct.

The method may comprise taking account of any error in the selected metamer for a pair of pixels when selecting a metamer for a next pair of pixels. By "error" is meant a difference between the luminance and/or chrominance that would be generated by the signal voltages corresponding to the selected metamer and the luminance and/or chrominance that would be generated by the signal voltages that would have been obtained just from the input data for the pixels.

The method may comprise, in the first mode, defining virtual pixels, at least one sub-pixel being shared between two neighbouring virtual pixels.

The different between a voltage applied to a sub-pixel in the first mode and the voltage applied to the sub-pixel in the second mode changes polarity every N frames. For example, N may be 1, or N may be 2, corresponding to a reversal after every frame or after every 2 frames respectively.

In the first mode, signal voltages to be applied to sub-pixels of a pixel of the image display panel may be determined from the received pixel data, from a secondary data value for the pixel, and from a parameter indicating the location of the pixel.

A second aspect of the invention provides a control circuit for a multi-primary display panel, the control circuit being adapted to perform a method of the first aspect. The processing of the image data to obtain the signal voltages may be carried out by a control circuit that is separate from the display panel, such as the LCD control electronics of FIG. 2, with the signal voltages then being sent from the control circuit to the display panel.

A third aspect of the invention provides display comprising a control circuit of the second aspect and a multi-primary display panel, the control circuit being adapted to, in use, output the modified sub-pixel colour component data values to the multi-primary display panel.

A fourth aspect of the invention provides a multi-primary display panel adapted to perform a method of the first aspect. In this aspect processing of the image data to obtain the signal voltages is carried out within the display panel, so that the display panel receives the image data and generates the required signal voltages.

A fifth aspect of the invention provides a computer-readable medium containing instructions which, when executed by a processor, cause the processor to perform a method of the first second aspect.

INDUSTRIAL APPLICABILITY

The embodiments of this invention are applicable to many display devices where four or more sub-pixel colour types are present in the display, and a user may benefit from the option of a privacy function on their normally wide-view display for use in certain public situations where privacy is desirable. Examples of such devices include mobile phones, Personal Digital Assistants (PDAs), laptop computers, desktop monitors, Automatic Teller Machines (ATMs) and Electronic Point of Sale (EPOS) equipment. Such devices can also be beneficial in situations where it is distracting and therefore unsafe for certain viewers (for example drivers or those operating heavy machinery) to be able to see certain images at certain times, for example an in car television screen while the car is in motion.

REFERENCE SIGNS LIST

1. LCD Control Electronics
2. Multi-primary liquid crystal panel
3. Principal viewer
4. Angular viewing range of the main image in the public mode
5. Off-axis viewer
6. Angular viewing range of the main image in the private mode.
7. Input main image data
8. Input side image data

The invention claimed is:

1. A method of processing image data for display on a display device, the display device comprising a multi-primary image display panel, the method comprising:

receiving image data constituting an image for display on the image display panel;

in a first mode, determining signal voltages to be applied to sub-pixels of the image display panel from the received image data and from a secondary data value for the pixel thereby to generate luminance variations perceivable at a first viewing position but substantially not perceivable at a second viewing position, and in the first mode, determining signal voltages to be applied to sub-pixels of the image display panel such that the signal voltage for a first sub-pixel of a first pixel of the image display panel is changed in an opposite direction to the signal voltage for a second sub-pixel of the first pixel.

2. A method as claimed in claim 1 and comprising, in a second mode, determining signal voltages to be applied to sub-pixels of the image display panel from the received image data thereby to generate an image perceivable at the first viewing position and at the second viewing position.

3. A method as claimed in claim 2 wherein the different between a voltage applied to a sub-pixel in the first mode and the voltage applied to the sub-pixel in the second mode changes polarity every N frames.

4. A method as claimed in claim 1 and comprising, in the first mode, determining signal voltages to be applied to sub-pixels of the image display panel so as to minimise a change in overall luminance of a pixel to a viewer at the second viewing position.

5. A method as claimed in claim 1 wherein the image display panel is an RGBW image display panel and the method comprises, in the first mode, determining signal voltages such that the signal voltage for a white sub-pixel of the first pixel is changed in an opposite direction to the signal voltages for red, green and blue sub-pixels of the first pixel.

6. A method as claimed in claim 1 wherein the image display panel is an RGBY image display panel and the method comprises, in the first mode, determining signal voltages such that the signal voltage for a yellow sub-pixel of the first pixel is changed in an opposite direction to the signal voltages for at least red and green sub-pixels of the first pixel.

7. A method as claimed in claim 1 and comprising, in the first mode, determining signal voltages to be applied to sub-pixels of the image display panel such that the signal voltage for a first sub-pixel of a second pixel of the image display panel is changed in an opposite direction to the signal voltage for a first sub-pixel of the first pixel, the first pixel being adjacent to the second pixel.

8. A method as claimed in claim 1 and comprising determining signal voltages to be applied to sub-pixels of the image display panel separately for each pixel pair.

9. A method as claimed in claim 1 and comprising, in the first mode, determining signal voltages to be applied to sub-pixels of the image display panel thereby to substantially maximise luminance variations perceivable at the first viewing position.

10. A method as claimed in claim 9 and comprising, in the first mode, determining whether the difference in pixel data between two pixels exceeds a threshold; and applying a method as defined in claim 9 to the two pixels only if the difference in pixel data between the two pixels exceeds the threshold.

11. A method as claimed in claim 1 and comprising, in the first mode: determining colour space values for a pixel for the pixel data for that pixel; determining colour space values for the pixel for the secondary data value for that pixel; wherein determining signal voltages to be applied to sub-pixels of the pixel further comprises determining the signal voltages on the basis of the colour space values.

12. A method as claimed in claim 1 and comprising: for a group of pixels in the image, calculating metamers for the pixels which have, to within an error threshold, the same average luminance and chrominance and which have the same individual luminance for each pixel in the group as the input image data; and selecting one of the metamers based on the calculated luminance variations perceivable in the first part of the first viewing angle range for the metamers.

13. A method as claimed in claim 12 and comprising taking account of any error in the selected metamer for a pair of pixels when selecting a metamer for a next pair of pixels.

14. A method as claimed in claim 1 and comprising, in the first mode, defining virtual pixels, at least one sub-pixel being shared between two neighbouring virtual pixels.

15. A method as claimed in claim 1 wherein, in the first mode, signal voltages to be applied to sub-pixels of a pixel of the image display panel are determined from the received pixel data, from a secondary data value for the pixel, and from a parameter indicating the location of the pixel.

16. A method of processing image data for display on a display device, the display device comprising a multi-primary image display panel, the method comprising:
receiving image data constituting an image for display on the image display panel;
in a first mode, determining signal voltages to be applied to sub-pixels of the image display panel from the received image data and from a secondary data value for the pixel thereby to generate luminance variations perceivable at a first viewing position but substantially not perceivable at a second viewing position, and
in the first mode, determining the signal voltage to be applied to a sub-pixel having the greatest luminance contribution so as to compensate for differences in luminance of other sub-pixels between the first mode and the second modes.

17. A method as claimed in claim 16 and comprising,
in the first mode, determining signal voltages to be applied to sub-pixels of the image display panel such that the signal voltage for a first sub-pixel of a first pixel of the image display panel is changed in an opposite direction to the signal voltage for a second sub-pixel of the first pixel;
in the first mode, determining the signal voltage to be applied to a white sub-pixel so as to compensate for differences in luminance of red, green and blue sub-pixels between the first mode and the second modes.

18. A method as claimed in claim 16 wherein the image display panel is an RGBW image display panel and the method comprises, in the first mode, determining signal voltages such that the signal voltage for a white sub-pixel of the first pixel is changed in an opposite direction to the signal voltages for red, green and blue sub-pixels of the first pixel; and comprising,
in the first mode, determining the signal voltage to be applied to a yellow sub-pixel so as to compensate for differences in luminance of red, green and blue sub-pixels between the first mode and the second modes.

19. A method as claimed in claim 16 wherein the image display panel is an RGBW image display panel and the method comprises, in the first mode, determining signal voltages such that the signal voltage for a white sub-pixel of the first pixel is changed in an opposite direction to the signal voltages for red, green and blue sub-pixels of the first pixel; and comprising,
in the first mode, determining the signal voltage to be applied to a yellow sub-pixel so as to compensate for differences in luminance of red and green sub-pixels between the first mode and the second modes.

20. A method as claimed in claim 16 and comprising, in the first mode: determining signal voltages to be applied to sub-pixels not having the greatest luminance contribution; determining the signal voltage to be applied to a sub-pixel having the greatest luminance contribution so as to compensate for differences in luminance of other sub-pixels between the first mode and the second modes; checking whether the determined signal voltage to be applied to a sub-pixel having the greatest luminance contribution exceeds a threshold voltage; and, if the determined signal voltage exceeds the threshold, setting the signal voltage to be applied to the sub-pixel having the greatest luminance contribution to be equal to the threshold voltage.

21. A method as claimed in claim 20 and further comprising, if the determined signal voltage to be applied to a sub-pixel having the greatest luminance contribution exceeds the threshold, taking this into account when determining signal voltages to be applied to sub-pixels of a subsequent pixel.

22. A method as claimed in claim 16 and comprising, in the first mode: determining signal voltages to be applied to sub-pixels not having the greatest luminance contribution; determining the signal voltage to be applied to a sub-pixel having the greatest luminance contribution so as to compensate for differences in luminance of other sub-pixels between the first mode and the second modes; checking whether the determined signal voltage exceeds a threshold voltage; and, if the determined signal voltage exceeds the threshold, re-determining the signal voltages to be applied to sub-pixels not having the greatest luminance contribution.

23. A method as claimed in claim 1 and comprising, in the first mode, determining whether the difference in pixel data between two pixels exceeds a threshold; if so, determining whether the signal voltages determined for the sub-pixels of the pixels lead to a change in overall chrominance of the two pixels have been modified; and if so, re-determining the signal voltages determined for the sub-pixels of the pixels to reduce the change in overall chrominance of the two pixels, while leaving the overall luminance in each pixel unchanged.

24. A method as claimed in claim 23 and further comprising, if the determined signal voltages to be applied to the sub-pixels result in a change in chrominance, taking this into account when determining signal voltages to be applied to sub-pixels of a subsequent pixel.

25. A method as claimed in claim 16 and comprising, in the first mode, determining signal voltages to be applied to sub-pixels of the image display panel thereby to substantially maximise luminance variations perceivable at the first viewing position.

26. A method as claimed in claim 16 and comprising, in the first mode, determining whether the difference in pixel data between two pixels exceeds a threshold; if so, determining whether the signal voltages determined for the sub-pixels of the pixels lead to a change in overall chrominance of the two pixels have been modified; and if so, re-determining the signal voltages determined for the sub-pixels of the pixels to reduce the change in overall chrominance of the two pixels, while leaving the overall luminance in each pixel unchanged.

27. A method as claimed in claim 16 and comprising: for a group of pixels in the image, calculating metamers for the pixels which have, to within an error threshold, the same average luminance and chrominance and which have the same individual luminance for each pixel in the group as the input image data; and selecting one of the metamers based on the calculated luminance variations perceivable in the first part of the first viewing angle range for the metamers.

28. A method as claimed in claim 16 and comprising, in the first mode, defining virtual pixels, at least one sub-pixel being shared between two neighbouring virtual pixels.

29. A method as claimed in claim 16 wherein, in the first mode, signal voltages to be applied to sub-pixels of a pixel of the image display panel are determined from the received pixel data, from a secondary data value for the pixel, and from a parameter indicating the location of the pixel.

* * * * *